US011129216B2

(12) United States Patent
Novlan et al.

(10) Patent No.: US 11,129,216 B2
(45) Date of Patent: *Sep. 21, 2021

(54) INITIAL ACCESS AND RADIO RESOURCE MANAGEMENT FOR INTEGRATED ACCESS AND BACKHAUL (IAB) WIRELESS NETWORKS

(71) Applicant: AT&T Intellectual Property I, L.P., Atlanta, GA (US)

(72) Inventors: Thomas David Novlan, Cedar Park, TX (US); Milap Majmundar, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,566

(22) Filed: May 11, 2020

(65) Prior Publication Data

US 2020/0275499 A1    Aug. 27, 2020

Related U.S. Application Data

(63) Continuation of application No. 16/238,067, filed on Jan. 2, 2019, now Pat. No. 10,687,375, which is a (Continued)

(51) Int. Cl.
*H04W 56/00* (2009.01)
*H04B 7/155* (2006.01)
(Continued)

(52) U.S. Cl.
CPC ........ *H04W 76/12* (2018.02); *H04B 7/15507* (2013.01); *H04B 7/2606* (2013.01);
(Continued)

(58) Field of Classification Search
None
See application file for complete search history.

(56) References Cited

U.S. PATENT DOCUMENTS

| 7,002,949 B2 | 2/2006 | Garcia-luna-aceves et al. |
| 7,020,110 B2 | 3/2006 | Walton et al. |
| (Continued) | | |

FOREIGN PATENT DOCUMENTS

| CN | 1627849 A | 6/2005 |
| CN | 101300858 A | 11/2008 |
| (Continued) | | |

OTHER PUBLICATIONS

Non-Final Office Action received for U.S. Appl. No. 16/186,766 dated Oct. 3, 2019, 64 pages.
(Continued)

*Primary Examiner* — Ajit Patel
(74) *Attorney, Agent, or Firm* — Amin, Turocy & Watson, LLP

(57) ABSTRACT

Establishment of integrated links comprising integrated wireless backhaul communications links and access communications links is facilitated by transmitting multiplexed sync signals to enable synchronization between the relay transmission point devices, and using a random access channel procedure to complete the establishment. The integrated wireless backhaul communications links and access communications links can be maintained by measuring channel characteristics of the backhaul communications links using a measurement reference signal.

20 Claims, 14 Drawing Sheets

Related U.S. Application Data continuation of application No. 15/445,760, filed on Feb. 28, 2017, now Pat. No. 10,206,232.

(60) Provisional application No. 62/401,864, filed on Sep. 29, 2016.

(51) Int. Cl.
  *H04W 76/12* (2018.01)
  *H04B 7/26* (2006.01)
  *H04W 8/00* (2009.01)
  *H04W 74/08* (2009.01)

(52) U.S. Cl.
  CPC ......... *H04W 8/005* (2013.01); *H04W 56/001* (2013.01); *H04W 74/0833* (2013.01); *H04W 56/0045* (2013.01)

(56) References Cited

U.S. PATENT DOCUMENTS

| | | |
|---|---|---|
| 7,209,443 B2 | 4/2007 | Mukai et al. |
| 7,260,366 B2 | 8/2007 | Lee et al. |
| 7,551,546 B2 | 6/2009 | Ma et al. |
| 7,636,573 B2 | 12/2009 | Walton et al. |
| 7,698,463 B2 | 4/2010 | Ogler et al. |
| 7,877,067 B2 | 1/2011 | Hwang et al. |
| 7,907,512 B1 | 3/2011 | Von der Embse |
| 7,953,046 B2 | 5/2011 | Takashima |
| 8,018,889 B2 | 9/2011 | Lim et al. |
| 8,040,844 B2 | 10/2011 | Olexa et al. |
| 8,055,269 B2 | 11/2011 | Feher |
| 8,102,794 B2 | 1/2012 | Shin et al. |
| 8,159,399 B2 | 4/2012 | Dorsey et al. |
| 8,165,536 B2 | 4/2012 | Sekiya et al. |
| 8,189,577 B2 | 5/2012 | Vaswani et al. |
| 8,218,550 B2 | 7/2012 | Axelsson et al. |
| 8,271,043 B2 | 9/2012 | Kim et al. |
| 8,300,555 B2 | 10/2012 | Horn et al. |
| 8,306,525 B2 | 11/2012 | Feher |
| 8,423,068 B2 | 4/2013 | Tiwari et al. |
| 8,509,060 B1 | 8/2013 | Dong et al. |
| 8,516,121 B1 | 8/2013 | Telang et al. |
| 8,537,658 B2 | 9/2013 | Sayana et al. |
| 8,537,714 B2 | 9/2013 | Liu |
| 8,553,560 B2 | 10/2013 | Axelsson et al. |
| 8,578,054 B2 | 11/2013 | Thubert et al. |
| 8,665,797 B2 | 3/2014 | Ding et al. |
| 8,681,747 B2 | 3/2014 | Dateki et al. |
| 8,711,716 B2 | 4/2014 | Chen et al. |
| 8,761,834 B2 | 6/2014 | Luz et al. |
| 8,774,154 B2 | 7/2014 | Bui |
| 8,787,257 B2 | 7/2014 | Fujita |
| 8,798,011 B2 | 8/2014 | Prasad et al. |
| 8,854,997 B2 | 10/2014 | Clow et al. |
| 8,873,496 B2 | 10/2014 | Moulsley et al. |
| 8,929,196 B2 | 1/2015 | Novak et al. |
| 8,948,046 B2 | 2/2015 | Kang et al. |
| 8,964,703 B2 | 2/2015 | Chen et al. |
| 9,007,992 B2 | 4/2015 | Charbit et al. |
| 9,013,974 B2 | 4/2015 | Walton et al. |
| 9,019,068 B2 | 4/2015 | Varoglu |
| 9,037,076 B2 | 5/2015 | Nagata et al. |
| 9,059,753 B2 | 6/2015 | Yang et al. |
| 9,078,187 B2 | 7/2015 | Huh |
| 9,084,261 B2 | 7/2015 | Gholmieh et al. |
| 9,094,145 B2 | 7/2015 | Yue et al. |
| 9,154,198 B2 | 10/2015 | Ei-Najjar et al. |
| 9,154,210 B2 | 10/2015 | Li et al. |
| 9,155,098 B2 | 10/2015 | Geirhofer et al. |
| 9,161,381 B2 | 10/2015 | Lee et al. |
| 9,184,870 B2 | 11/2015 | Sampath et al. |
| 9,191,098 B2 | 11/2015 | Kazmi et al. |
| 9,215,322 B1 | 12/2015 | Wu et al. |
| 9,240,871 B2 | 1/2016 | Walton et al. |
| 9,241,311 B2 | 1/2016 | Sebeni et al. |
| 9,246,651 B2 | 1/2016 | Guo et al. |
| 9,265,053 B2 | 2/2016 | Blankenship et al. |
| 9,288,719 B2 | 3/2016 | Hui et al. |
| 9,306,725 B2 | 4/2016 | Papasakellariou et al. |
| 9,307,489 B2 | 4/2016 | Yerrabommanahalli et al. |
| 9,313,747 B2 | 4/2016 | Zhu et al. |
| 9,337,970 B2 | 5/2016 | Hammarwall et al. |
| 9,338,769 B1 | 5/2016 | Naim et al. |
| 9,345,037 B2 | 5/2016 | Ode |
| 9,357,472 B2 | 5/2016 | Mukherjee |
| 9,401,750 B2 | 7/2016 | Sayana et al. |
| 9,408,220 B2 | 8/2016 | Gore et al. |
| 9,413,509 B2 | 8/2016 | Chen et al. |
| 9,414,427 B2 | 8/2016 | Yang et al. |
| 9,420,577 B2 | 8/2016 | Kim et al. |
| 9,432,876 B2 | 8/2016 | Ji et al. |
| 9,451,476 B2 | 9/2016 | Shoshan et al. |
| 9,467,909 B2 | 10/2016 | Faerber et al. |
| 9,510,340 B2 | 11/2016 | Kim et al. |
| 9,602,183 B2 | 3/2017 | Kim et al. |
| 9,742,480 B1 | 8/2017 | Nammi et al. |
| 9,936,517 B2 | 4/2018 | Kotecha |
| 10,027,401 B2 | 7/2018 | Speight et al. |
| 10,680,864 B2 | 6/2020 | Zhang et al. |
| 10,749,644 B2 | 8/2020 | Islam et al. |
| 2003/0039217 A1 | 2/2003 | Seo et al. |
| 2003/0043756 A1 | 3/2003 | Reynders et al. |
| 2004/0162048 A1 | 8/2004 | Milbar et al. |
| 2004/0218604 A1 | 11/2004 | Porter |
| 2004/0253955 A1 | 12/2004 | Love et al. |
| 2004/0255040 A1 | 12/2004 | Lopes et al. |
| 2005/0036487 A1 | 2/2005 | Srikrishna |
| 2005/0250506 A1 | 11/2005 | Beale et al. |
| 2006/0240777 A1 | 10/2006 | Ruuska |
| 2007/0274252 A1 | 1/2007 | Zhang et al. |
| 2007/0060178 A1 | 3/2007 | Gorokhov et al. |
| 2007/0110198 A1 | 5/2007 | Skarby et al. |
| 2007/0160156 A1 | 7/2007 | Melzer et al. |
| 2007/0253496 A1 | 11/2007 | Giannakis et al. |
| 2007/0288618 A1 | 12/2007 | Yeo et al. |
| 2008/0002723 A1 | 1/2008 | Pusateri |
| 2008/0049851 A1 | 2/2008 | Nangia et al. |
| 2008/0095223 A1 | 4/2008 | Tong et al. |
| 2008/0159214 A1 | 7/2008 | Majonen et al. |
| 2008/0232240 A1 | 9/2008 | Baum et al. |
| 2009/0029645 A1 | 1/2009 | Leroudier |
| 2009/0052448 A1 | 2/2009 | Ramakrishnan et al. |
| 2009/0073922 A1 | 3/2009 | Malladi et al. |
| 2009/0122884 A1 | 5/2009 | Vook et al. |
| 2009/0168915 A1 | 7/2009 | Aoki et al. |
| 2009/0262673 A1 | 10/2009 | Hermersdorf |
| 2009/0295623 A1 | 12/2009 | Falk |
| 2009/0296802 A1 | 12/2009 | Ermolayev et al. |
| 2010/0002675 A1 | 1/2010 | Fu et al. |
| 2010/0027502 A1 | 2/2010 | Chen et al. |
| 2010/0067591 A1 | 3/2010 | Luo et al. |
| 2010/0111030 A1 | 5/2010 | Almgren et al. |
| 2010/0178057 A1 | 7/2010 | Shieh |
| 2010/0202322 A1 | 8/2010 | Cai et al. |
| 2010/0238826 A1 | 9/2010 | Borran et al. |
| 2010/0260126 A1* | 10/2010 | Ulupinar ............... H04W 92/20 370/329 |
| 2011/0034198 A1 | 2/2011 | Chen et al. |
| 2011/0039495 A1 | 2/2011 | Sawai et al. |
| 2011/0044262 A1 | 2/2011 | Satapathy et al. |
| 2011/0085513 A1 | 4/2011 | Chen et al. |
| 2011/0096727 A1 | 4/2011 | Bergman et al. |
| 2011/0176445 A1 | 7/2011 | Chen |
| 2011/0281579 A1 | 11/2011 | Kummetz |
| 2011/0305161 A1 | 12/2011 | Ekpenyong et al. |
| 2012/0002598 A1 | 1/2012 | Seo et al. |
| 2012/0013564 A1 | 1/2012 | Westhues et al. |
| 2012/0020230 A1 | 1/2012 | Chen et al. |
| 2012/0087276 A1 | 4/2012 | Huang et al. |
| 2012/0093109 A1 | 4/2012 | Dong et al. |
| 2012/0106472 A1 | 5/2012 | Rosa et al. |
| 2012/0147810 A1* | 6/2012 | Wang ................... H04W 24/02 370/315 |

(56) References Cited

U.S. PATENT DOCUMENTS

| | | |
|---|---|---|
| 2012/0327757 A1 | 12/2012 | Wang et al. |
| 2012/0327794 A1 | 12/2012 | Han et al. |
| 2013/0003604 A1 | 1/2013 | Blankenship et al. |
| 2013/0028241 A1 | 1/2013 | Wang et al. |
| 2013/0044673 A1 | 2/2013 | Bi et al. |
| 2013/0044707 A1 | 2/2013 | Chen |
| 2013/0064207 A1 | 3/2013 | Wang et al. |
| 2013/0095748 A1 | 4/2013 | Hu et al. |
| 2013/0142136 A1* | 6/2013 | Pi .................. H04B 7/1555 370/329 |
| 2013/0155831 A1 | 6/2013 | Kim et al. |
| 2013/0210447 A1 | 8/2013 | Moe et al. |
| 2013/0215844 A1 | 8/2013 | Seol et al. |
| 2013/0235808 A1 | 9/2013 | Earnshaw et al. |
| 2013/0242902 A1 | 9/2013 | Liu et al. |
| 2013/0258973 A1 | 10/2013 | Khoshnevis et al. |
| 2013/0301628 A1 | 11/2013 | Dacosta et al. |
| 2013/0336199 A1 | 12/2013 | Schwartz et al. |
| 2013/0337795 A1 | 12/2013 | Falconetti et al. |
| 2014/0010126 A1 | 1/2014 | Sayana et al. |
| 2014/0016534 A1 | 1/2014 | Kim et al. |
| 2014/0044061 A1 | 2/2014 | Yue et al. |
| 2014/0056272 A1 | 2/2014 | Gao et al. |
| 2014/0064160 A1 | 3/2014 | Verger et al. |
| 2014/0073339 A1 | 3/2014 | Yang |
| 2014/0086063 A1 | 3/2014 | Wu |
| 2014/0119333 A1 | 5/2014 | Hedlund et al. |
| 2014/0146754 A1 | 5/2014 | Bayesteh et al. |
| 2014/0189155 A1 | 7/2014 | Morris |
| 2014/0201324 A1 | 7/2014 | Zhang et al. |
| 2014/0269552 A1 | 9/2014 | Saito |
| 2014/0281670 A1 | 9/2014 | Vasseur et al. |
| 2014/0293987 A1 | 10/2014 | Zhu et al. |
| 2015/0009888 A1* | 1/2015 | Pitakdumrongkija ...... H04B 7/15507 370/315 |
| 2015/0031284 A1* | 1/2015 | Pitakdumrongkija ...... H04B 7/2606 455/9 |
| 2015/0071075 A1 | 3/2015 | Ramakrishnan |
| 2015/0071233 A1 | 3/2015 | Wang et al. |
| 2015/0071242 A1 | 3/2015 | Vilaipornsawai et al. |
| 2015/0092695 A1 | 4/2015 | Zhao et al. |
| 2015/0110029 A1 | 4/2015 | Hwang et al. |
| 2015/0139208 A1 | 5/2015 | Chan et al. |
| 2015/0146655 A1 | 5/2015 | Hui et al. |
| 2015/0155993 A1 | 6/2015 | Berggren et al. |
| 2015/0156082 A1 | 6/2015 | Kakadia et al. |
| 2015/0171944 A1* | 6/2015 | Kalhan .............. H04B 7/0413 370/329 |
| 2015/0181534 A1 | 6/2015 | Andersson et al. |
| 2015/0188650 A1 | 7/2015 | Au et al. |
| 2015/0215085 A1 | 7/2015 | Xu et al. |
| 2015/0244499 A1 | 8/2015 | Alexander |
| 2015/0245272 A1 | 8/2015 | Lindoff et al. |
| 2015/0249998 A1 | 9/2015 | Long et al. |
| 2015/0282150 A1 | 10/2015 | Nigam et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |
| 2015/0341093 A1 | 11/2015 | Ji et al. |
| 2015/0341100 A1 | 11/2015 | Kwak et al. |
| 2015/0341141 A1 | 11/2015 | Pajukoski et al. |
| 2015/0349996 A1 | 12/2015 | Vilaipornsawai et al. |
| 2015/0351098 A1 | 12/2015 | Schellmann et al. |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0014762 A1 | 1/2016 | Ji et al. |
| 2016/0028520 A1 | 1/2016 | Nogami et al. |
| 2016/0029359 A1 | 1/2016 | Agiwal et al. |
| 2016/0050039 A1 | 2/2016 | Ma et al. |
| 2016/0080187 A1 | 3/2016 | Yun et al. |
| 2016/0080961 A1 | 3/2016 | Kim et al. |
| 2016/0080963 A1 | 3/2016 | Marinier et al. |
| 2016/0087694 A1 | 3/2016 | Vilaipornsawai et al. |
| 2016/0088521 A1 | 3/2016 | Ho et al. |
| 2016/0119097 A1 | 4/2016 | Nam et al. |
| 2016/0119931 A1 | 4/2016 | Soriaga et al. |
| 2016/0128028 A1 | 5/2016 | Mallik et al. |
| 2016/0128034 A1 | 5/2016 | Choi et al. |
| 2016/0128072 A1 | 5/2016 | Rajagopal et al. |
| 2016/0142117 A1 | 5/2016 | Rahman et al. |
| 2016/0142292 A1 | 5/2016 | Au et al. |
| 2016/0149686 A1 | 5/2016 | Tsai |
| 2016/0154756 A1 | 6/2016 | Dodson et al. |
| 2016/0173244 A1 | 6/2016 | Ding |
| 2016/0183242 A1 | 6/2016 | Cordeiro et al. |
| 2016/0191216 A1 | 6/2016 | Ma et al. |
| 2016/0198471 A1 | 7/2016 | Young et al. |
| 2016/0211999 A1 | 7/2016 | Wild et al. |
| 2016/0233938 A1 | 8/2016 | Mondal et al. |
| 2016/0254889 A1 | 9/2016 | Shattil |
| 2016/0255631 A1 | 9/2016 | Cui et al. |
| 2016/0255667 A1 | 9/2016 | Schwartz |
| 2016/0262118 A1 | 9/2016 | Kim et al. |
| 2016/0269135 A1 | 9/2016 | Jiang et al. |
| 2016/0269212 A1 | 9/2016 | Vilaipornsawai et al. |
| 2016/0285611 A1 | 9/2016 | Fischer et al. |
| 2016/0294521 A1 | 10/2016 | Au et al. |
| 2016/0301505 A1 | 10/2016 | Furuskog et al. |
| 2016/0316458 A1 | 10/2016 | Kwon |
| 2016/0352543 A1 | 12/2016 | Hu et al. |
| 2016/0352551 A1 | 12/2016 | Zhang et al. |
| 2016/0353374 A1 | 12/2016 | Höglund et al. |
| 2016/0353420 A1 | 12/2016 | You et al. |
| 2016/0353453 A1 | 12/2016 | Au et al. |
| 2016/0353475 A1 | 12/2016 | Au et al. |
| 2017/0019847 A1 | 1/2017 | Han et al. |
| 2017/0078054 A1 | 3/2017 | Hadani et al. |
| 2017/0078826 A1 | 3/2017 | Cui et al. |
| 2017/0118054 A1 | 4/2017 | Ma et al. |
| 2017/0126299 A1 | 5/2017 | Wei et al. |
| 2017/0126458 A1 | 5/2017 | Shattil |
| 2017/0134205 A1 | 5/2017 | Kim et al. |
| 2017/0135084 A1 | 5/2017 | Kuchibhotla et al. |
| 2017/0163456 A1 | 6/2017 | Chen |
| 2017/0188366 A1 | 6/2017 | Zhang et al. |
| 2017/0215170 A1 | 7/2017 | Islam et al. |
| 2017/0223700 A1 | 8/2017 | Thubert et al. |
| 2017/0237537 A1 | 8/2017 | Nogami et al. |
| 2017/0257238 A1 | 9/2017 | Qian et al. |
| 2017/0257860 A1 | 9/2017 | Nam et al. |
| 2017/0265119 A1 | 9/2017 | Fang |
| 2017/0272210 A1 | 9/2017 | Zhang |
| 2017/0288928 A1 | 10/2017 | Xu et al. |
| 2017/0311188 A1 | 10/2017 | Sun et al. |
| 2017/0325246 A1 | 11/2017 | Agarwal et al. |
| 2017/0331577 A1 | 11/2017 | Parkvall et al. |
| 2017/0353222 A1 | 12/2017 | Wei et al. |
| 2017/0367046 A1 | 12/2017 | Papasakellariou |
| 2017/0374558 A1 | 12/2017 | Zhao et al. |
| 2018/0007696 A1 | 1/2018 | Hasarchi et al. |
| 2018/0014320 A1 | 1/2018 | Xu et al. |
| 2018/0035423 A1 | 2/2018 | Wang et al. |
| 2018/0035459 A1 | 2/2018 | Islam et al. |
| 2018/0049047 A1 | 2/2018 | Lin et al. |
| 2018/0049169 A1 | 2/2018 | Lin et al. |
| 2018/0049233 A1 | 2/2018 | Luo et al. |
| 2018/0049236 A1 | 2/2018 | Sun et al. |
| 2018/0062823 A1 | 3/2018 | Hasegawa |
| 2018/0063818 A1 | 3/2018 | Chen et al. |
| 2018/0063865 A1 | 3/2018 | Islam et al. |
| 2018/0070341 A1 | 3/2018 | Islam et al. |
| 2018/0092095 A1 | 3/2018 | Zeng et al. |
| 2018/0097598 A1 | 4/2018 | Ang et al. |
| 2018/0152269 A1 | 5/2018 | Xiong et al. |
| 2018/0167933 A1 | 6/2018 | Yin et al. |
| 2018/0176059 A1 | 6/2018 | Medles et al. |
| 2018/0184410 A1 | 6/2018 | Wilson et al. |
| 2018/0191473 A1 | 7/2018 | Ashraf et al. |
| 2018/0199341 A1 | 7/2018 | Baldemair et al. |
| 2018/0219606 A1 | 8/2018 | Ng et al. |

(56) References Cited

U.S. PATENT DOCUMENTS

| | | |
|---|---|---|
| 2018/0220400 A1 | 8/2018 | Nogami et al. |
| 2018/0227156 A1 | 8/2018 | Papasakellariou |
| 2019/0097861 A1 | 3/2019 | Kawasaki et al. |
| 2019/0104549 A1 | 4/2019 | Deng et al. |
| 2019/0208482 A1 | 7/2019 | Tooher et al. |

FOREIGN PATENT DOCUMENTS

| | | |
|---|---|---|
| CN | 101438611 A | 5/2009 |
| CN | 101631355 A | 1/2010 |
| CN | 102612074 A | 7/2012 |
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| CN | 105264787 A | 1/2016 |
| CN | 105453471 A | 3/2016 |
| CN | 105659655 A | 6/2016 |
| EP | 0 720 316 A1 | 7/1996 |
| EP | 1 998 586 A1 | 12/2008 |
| EP | 2 400 674 A2 | 12/2011 |
| EP | 2409517 A2 | 1/2012 |
| EP | 2 858 408 A1 | 4/2015 |
| EP | 3 065 448 A1 | 9/2016 |
| EP | 3 160 051 A1 | 4/2017 |
| JP | 2011-205679 A | 10/2011 |
| JP | 2012213165 A1 | 11/2012 |
| JP | 2013539616 A | 10/2013 |
| JP | 5373076 B2 | 12/2013 |
| JP | 2013258715 A | 12/2013 |
| JP | 2018-507607 A | 3/2018 |
| WO | 2005/064872 A1 | 7/2005 |
| WO | 2008/011717 A1 | 1/2008 |
| WO | 2013/081628 A1 | 6/2013 |
| WO | 2013/107053 A1 | 7/2013 |
| WO | 2013/136777 A1 | 9/2013 |
| WO | 2015/095844 A1 | 6/2015 |
| WO | 2015/108460 A1 | 7/2015 |
| WO | 2015/122665 A1 | 8/2015 |
| WO | 2015/140601 A1 | 9/2015 |
| WO | 2015/186974 A1 | 12/2015 |
| WO | 2016/023207 | 2/2016 |
| WO | 2016/026507 A1 | 2/2016 |
| WO | 2016/030300 A1 | 3/2016 |
| WO | 2016/065068 A2 | 4/2016 |
| WO | 2016/068628 A1 | 5/2016 |
| WO | 2016/086971 A1 | 6/2016 |
| WO | 2016/105120 A1 | 6/2016 |
| WO | 2016/115655 A1 | 7/2016 |
| WO | 2016/128728 A2 | 8/2016 |
| WO | 2016/170389 A1 | 10/2016 |

OTHER PUBLICATIONS

Non-Final Office Action received for U.S. Appl. No. 16/238,067 dated Oct. 3, 2019, 60 pages.

Notice of Allowance received for U.S. Appl. No. 15/376,209 dated Nov. 14, 2019, 40 pages.

Notification of Reason for Refusal received for Korean Patent Application Serial No. 10-2019-7009108 dated Jan. 3, 2020, 8 pages (Including English Translation).

Notice of Allowance received for U.S. Appl. No. 16/238,067 dated Feb. 6, 2020, 22 pages.

Communication pursuant to Article 94(3) EPC received for EP Patent Application Serial No. 17778094.7 dated Jan. 30, 2020, 4 pages.

Communication pursuant to Article 94(3) EPC received for EP Patent Application Serial No. 17778093.9 dated Feb. 12, 2020, 10 pages.

Mogensen et al. "5G small cell optimized radio design." IEEE. 2013. http://vbn.aau.dk/files/195969578/Globecom_5G_2013_v16emb.pdf.

Peng et al. "System architecture and key technologies for 5G heterogeneous cloud radio access networks." IEEE network 29.2 (2015): 614. http://arxiv.org/pdf/1412.6677.

Mogensen et al. "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf.

Li et al. "Energyoptimal scheduling with dynamic channel acquisition in wireless downlinks." IEEE Transactions on Mobile Computing 9.4 (2010): 527539. http://wwwbcf.usc.edu/~mjneely/pdf_papers/lineelycdc07.pdf.

Huynh et al "Joint Downlink and Uplink Interference Management for Device to Device Communication Underlaying Cellular Networks." Year: 2016 vol. 4 pp. 4420 4430 DOI:10.1109/ACCESS.2016.2603149 IEEE Journals & Magazines. http://ieeexplore.ieee.org/iel7/6287639/7419931/07552542.pdf.

Jungnickel et al. "The role of small cells coordinated multipoint and massive MIMO in 5G." IEEE Communications Magazine 52.5 (2014): 44-51. http://nashville.dyndns.org:823/YourFreeLibrary/_lte/Small%20Cells/smallCells1.pdf.

Nam et al. "Advanced interference management for 5G cellular networks." IEEE Communications Magazine 52.5 (2014): 52-60. https://www.researchgate.net/profile/Dongwoon_Bai/publication/262416968_Advanced_Interference_Management_for_5G_Cellular_Networks2/links/5515c7890cf2f7d80a3594b5.pdf.

Guvensen et al. "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436.

Björnson. "Massive MIMO for 5G." Tutorial at 2015 IEEE International Workshop SPAWC Stockholm Sweden Jun. 29, 2015. https://pdfs.semanticscholar.org/85fc/19cd9a0090c4e32f5520d8edc86b592f5178.pdf.

Yang et al. "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/tvt-hanzo-2410759-proof%20(1).pdf.

Niu et al. "A survey of millimeter wave communications (mmWave) for 5G: opportunities and challenges." Wireless Networks 21.8 (2015): 2657-2676.

Miao et al. "Self-organized multi-hop millimeter-wave backhaul network: Beam alignment and dynamic routing." Networks and Communications (EuCNC) 2015 European Conference on. IEEE 2015.

Vijayakumar et al. "Review on Routing Algorithms in Wireless Mesh Networks." International Journal of Computer Science and Telecommunications 3.5 (2012): 8792. http://www.ijcst.org/Volume3/Issue5/p15_3_5.pdf.

Bemmoussat et al."Efficient routing protocol to support qos in wireless mesh network." International Journal of Wireless & Mobile Networks 4.5 (2012): 89. http://search.proquest.com/openview/be6898c2de82656d6aa1ae75b947ede0/1 ?pqorigsite= Gscholar.

Draves et al. "Routing in multiradio multihop wireless mesh networks." Proceedings of the 10th annual international conference on Mobile computing and networking. ACM 2004. http://www.cs.jhu.edu/~cs647/classpapers/ Routing/p114draves. Pdf.

Wazwaz et al. "Medium Access and Routing in Multi Hop Wireless Infrastructures." Univ. of Twente Enschede the Netherlands (2005). https://www.utwente.nl/ewi/dacs/assignments/completed/master/reports/thesi s_aymanwazwaz.pdf.

Hong, et al. "Applications of selfinterference cancellation in 5G and beyond." IEEE Communications Magazine 52.2 (2014): 114121. http://stevenhong. com/pubs/CommMag145G. pdf.

Hossain. "5G wireless communication systems." American Journal of Engineering Research (AJER) e-ISSN (2013): 2320-0847. http://www.academia.edu/download/32242528/ZP210344353.pdf.

Osseiran, et al. "Scenarios for 5G mobile and wireless communications: the vision of the METIS project." IEEE Communications Magazine 52.5 (2014): 26-35. https://www.metis2020.com/wp-content/uploads/publications / IEEEComMag_Osseiran_et_al_METIS_overview_scenarios_201405.pdf.

(56) References Cited

OTHER PUBLICATIONS

Hu, et al. "An energy efficient and spectrum efficient wireless heterogeneous network framework for 5G systems." IEEE Communications Magazine 52.5 (2014): 94-101. http://www.academia.edu/download/34030549 / An_Energy_Efficient_and_Spectrum_Efficient_Wireless_Heterogeneous_Network_Framework_for.

Wu, et al. "Recent advances in energy-efficient networks and their application in 5G systems." IEEE Wireless Communications 22.2 (2015): 145-151. https://www.researchgate.net/profile/Gang_Wu15/publication/275673965_Recent_advances_in_energyefficient_networks_and_their_application_in_5G_systems/links/559f3d1508ae03c44a5ce9ac.pdf.

Nakamura, et al. "5G radio access: Requirements, concept and experimental trials." IEICE Transactions on Communications 98.8 (2015): 1397-1406. https://pdfs.semanticscholar.org/68fa/40d96cf347627d2a2875777de3de1fb43223.pdf.

Kim, et al., "Interference Management via Sliding-Window Coded Modulation for 5G Cellular Networks." IEEE Communications Magazine, Nov. 2016, pp. 82-89, vol. 54, Issue 11, 8 pages.

International Search Report and Written Opinion for Application No. PCT/US2017/052582, dated Dec. 6, 2017, 16 pages.

ETRI, "Potential CSI-RS and CSI feedback enhancements for EBF/FD-MIMO" 3GPP TSG RAN WG1 Meeting #19 San Francisco. USA, Nov. 11-21, 2014, 6 pages.

International Search Report and Written Opinion for Application No. PCT/US2017/052581 dated Nov. 24, 2017, 18 pages.

Nokia et al., "On System Design for Multiple Numerologies-Initial Access" 3GPP TSG-RAN WG1 #86, Gothenburg, Sweden, Aug. 22-26, 2016, 6 pages.

International Search Report and Written Opinion for Application No. PCT/US2017/052579, dated Jan. 2, 2018, 16 pages.

Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.

CATT: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.

NTT Docomo et al., "Workplan for Study on NR Access Technology" 3GPP Draft; R1-167373 Work Plan for Nr, 3GPP TSG RAN WG1 Meeting #86, Göteborg, Sweden Aug. 22-26, 2016, 30 pages.

Huawei, HiSilicon, AT&T, Samsung, Qualcomm, Ericsson, ASTRI, [. . . ] "WF on Integrated Backhaul and Access", 3GPP Draft; R1-168429 3GPP TSG RAN WG1 Meeting #86 Gothenburg, Sweden, Aug. 22-26, 2016, 6 pages.

Invitation to Pay Additional Fees and, where Applicable, Protest Fee issued for Application No. PCT/US2017/052578 dated Nov. 30, 2017, 18 pages.

Graffi et al., "Monitoring and Management of Structured Peer-to-Peer Systems", IEEE P2P'09—Sep. 9-11, 2009, pp. 311-320.

Acampora et al., "Control and Quality-of-Service Provisioning in High-Speed Microcellular Networks" IEEE Personal Communications, Second Quarter 1994, pp. 34-43.

Non-Final Office Action received for U.S. Appl. No. 15/376,137 dated Mar. 23, 2018, 38 pages.

International Search Report and Written Opinion received for PCT Application No. PCT/US2017/052578, dated Jan. 22, 2018, 20 pages.

Non-Final Office Action received for U.S. Appl. No. 15/432,515 dated Mar. 30, 2018, 48 pages.

Non-Final Office Action received for U.S. Appl. No. 15/376,377 dated Apr. 5, 2018, 43 pages.

Non-Final Office Action received for U.S. Appl. No. 15/340,744 dated Apr. 26, 2018, 51 pages.

Non-Final Office Action received for U.S. Appl. No. 15/376,209 dated May 1, 2018, 68 pages.

Non-Final Office Action received for U.S. Appl. No. 15/445,760 dated Apr. 30, 2018, 47 pages.

Notice of Allowance received for U.S. Appl. No. 15/445,760 dated Sep. 24, 2018, 29 pages.

Final Office Action received for U.S. Appl. No. 15/340,744 dated Nov. 28, 2018, 38 pages.

Final Office Action received for U.S. Appl. No. 15/432,515 dated Oct. 29, 2018, 43 pages.

Final Office Action received for U.S. Appl. No. 15/376,209 dated Dec. 10, 2018, 37 pages.

Notice of Allowance received for U.S. Appl. No. 15/432,515 dated Feb. 25, 2019, 27 pages.

Non-Final Office Action received for U.S. Appl. No. 15/376,209 dated May 2, 2019, 40 pages.

Non-Final Office Action received for U.S. Appl. No. 15/340,744 dated Jun. 25, 2019, 32 pages.

Non-Final Office Action received for U.S. Appl. No. 16/174,854 dated Aug. 29, 2019, 48 pages.

Communication pursuant to Article 94(3) EPC received for EP Patent Application Serial No. 17778094 dated Jun. 2, 2020, 04 pages.

Notice of Reasons for Refusal received for Japanese Patent Application Serial No. 2019517275 dated May 26, 2020, 21 pages.

Notice of Reasons for Refusal received for Korean Patent Application Serial No. 20197009054 dated May 18, 2020, 11 pages.

Decision of Patent Grant received for Japanese Patent Application Serial No. 10-2019-7009108 dated Jun. 3, 2020, 3 page.

Communication Pursuant to Rules 94(3) EPC received for EP Patent Application Serial No. 17778093.9 dated Sep. 29, 2020, 08 pages.

Notification of Reason for Refusal received for Korean Patent Application Serial No. 10-2019-7009057 dated Aug. 28, 2020, 10 pages (Including English Translation).

Qualcomm Incorporated, "Discussion on advanced CSI reporting and initial evaluation results", R-166274 3GPP TSG-RAN WG1 #86, Aug. 22-26, 2016, 06 pages.

Notification of Reason for Refusal received for Korean Patent Application Serial No. 10-20197009054 dated Nov. 13, 2020, 5 pages (Including English Translation).

Office Action received for Chinese Patent Application Serial No. 201780068599.4 dated Dec. 23, 2020, 10 pages.

Office Action received for Chinese Patent Application Serial No. 201780068600.3 dated Jan. 27, 2021, 8 pages.

Notice of Reasons for Refusal received for Japanese Patent Application Serial No. 2019517275 dated Dec. 25, 2020, 8 pages.

Indian Office Action for Indian Application Serial No. 201947011929 dated Sep. 22, 2020, 8 pages.

First Office Action received for Chinese Patent Application Serial No. 201780068606.0 dated Nov. 12, 2020, 7 pages.

Non-Final Office Action received for U.S. Appl. No. 16/789,609 dated Jun. 10, 2021, 119 pages.

ZTE, "Discussion on Feedback Scheme for Reduced Dimension Channel", 3 GPP TSG-RANWG1#80b Apr. 11, 2015 R1-151743, 6 pages.

ZTE., "Discussion on CSI-RS and CSI enhancement for EBF/FD-MIMO", 3GPP TSG-RAN WG1#81 R1 May 16, 2015, R1-152985, 8 pages.

AT&T "Generic CSI feedback framework for NRMIMO", 3GPPTSG-RANWG1#86b, Oct. 1, 2016, R1-1609388, 7 pages.

Notification of Final Rejection received for Korean Patent Application Serial No. 10-2019-7009057 dated Apr. 20, 2021, 7 pages (Including English Translation).

Qualcomm Incorporated,"discussion on advanced CSI reporting and initial evaluation results", 3GPP TSG RAN WG1 #86, R1-166274, Aug. 13, 2016, 6 pages.

ETRI., "potential CSI-RS and CSI feedback enhancements for EBF FD-MIMO", 3GPP TSG RAN WG1 #79, 3GPP server publication, R1-144923, Nov. 8, 2014, 6 Pages.

Communication pursuant to Article 94(3) EPC received for EP Patent Application Serial No. 17778093.9 dated May 18, 2021, 10 pages.

Grant of Patent Received for Korean application No. 10-2019-7009054 dated May 27, 2021, 4 pages(lncluding English Translation).

Nokia, Alcatel-Lucent Shanghai Bell., "On System Design for Multiple Numerologies—Initial Access", 3GPP R1-167258, R1-167258, 6 pages.

(56) References Cited

OTHER PUBLICATIONS

Notice of Reasons for Refusal received for Japanese application No. 2019-517294 dated Apr. 14, 2021, 14 pages Including English Translation).
Examination Report received for Indian application No. 201947011936 dated Apr. 8, 2021, 6 pages.
Communication pursuant to Article 94(3) EPC received for EP Patent Application Serial No. 17778092.1 dated May 10, 2021, 10 pages.
Second Office Action received for Chinese Patent Application Serial No. 201780068606.0 dated May 12, 2021, 13 pages. (Including English Translation).
Notice of Reasons for Refusal received for Japanese application No. 2019-517317 dated May 25, 2021, 6 pages Including English Translation).
NTT Docomo., "RAN WG's progress on NR technology SI in the May meeting", 3GPP TSG-RAN WG2 #95, R2-164707, Aug. 2016, 9 pages.
AT&T and "Initial Access and Mobility Requirementsfor NR" and 3GPP TSG-RAN WG1#86b R1-1609387, the Internet<URL:http://www.3gpp.org/ftp/tsg_ran/WG1_RL1/TSGR1_86b/Docs/R1-1609387.zip>, Oct. 1, 2016, 6 Pages.
Notification of Preliminary Rejection received for Korean Patent Application Serial No. 10-2019-7009057 dated Jul. 16, 2021, 8 pages (Including English Translation).
ZTE Corporation et al., R1-164297, Consideration on CSI measurement and feedback for NR MIMO, 3GPP TSG RAN WG1 #85, 3GPP (May 14, 2016) 4 pages.
Huawei et al., R1-167197, CSI acquisition mechanism for NR DL MIMO, 3GPP TSG RAN WG1 #86, 3GPP (Aug. 12, 2016) 9 pages.
Office Action dated Jul. 5, 2021 for Chinese Application No. 201780068599.4, 11 pages (with English Summary).

\* cited by examiner

INITIAL ACCESS AND RADIO RESOURCE MANAGEMENT FOR INTEGRATED ACCESS AND BACKHAUL (IAB) WIRELESS NETWORKS

RELATED APPLICATIONS

The subject patent application is a continuation of, and claims priority to each of, U.S. patent application Ser. No. 16/238,067 (now U.S. Pat. No. 10,687,375), filed Jan. 2, 2019, and entitled "INITIAL ACCESS AND RADIO RESOURCE MANAGEMENT FOR INTEGRATED ACCESS AND BACKHAUL (IAB) WIRELESS NETWORKS," which is a continuation of U.S. patent application Ser. No. 15/445,760 (now U.S. Pat. No. 10,206,232), filed Feb. 28, 2017, and entitled "INITIAL ACCESS AND RADIO RESOURCE MANAGEMENT FOR INTEGRATED ACCESS AND BACKHAUL (IAB) WIRELESS NETWORKS," each of which applications further claims priority to U.S. Provisional Application No. 62/401,864, filed on Sep. 29, 2016, and entitled, "INITIAL ACCESS AND RADIO RESOURCE MANAGEMENT FOR INTEGRATED ACCESS AND BACKHAUL (IAB) WIRELESS NETWORKS," which applications are incorporated by reference herein in their entireties.

TECHNICAL FIELD

The present application relates generally to the field of wireless communication and, for example, to a system and method for integrating the wireless backhaul communications between relay transmission point devices (rTPs) and the access communications between user equipment (UE) and rTPs, including in 5G networks or other next generation networks.

BACKGROUND

Radio technologies in cellular communications have grown rapidly and evolved since the launch of analog cellular systems in the 1980s, starting from the first generation (1G) in the 1980s, second generation (2G) in the 1990s, third generation (3G) in the 2000s, and fourth generation (4G) in the 2010s (comprising variants of long term evolution (LTE) such as time division LTE (TD-LTE), frequency division duplex LTE (FDD-LTE), advanced extended global platform (AXGP), LTE advanced (LTE-A), and TD-LTE advanced (TD-LTE-A) and other releases). The amount of traffic in cellular networks has experienced tremendous growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IoT)). Additional technological growth comprises 4K video, augmented reality, cloud computing, industrial automation, and voice to voice (V2V) communications.

Consequently, advancements in future networks are driven by the need to provide and account for massive connectivity and volume, expanded throughput and capacity, and ultra-low latency. Fifth generation (5G) access networks, which can also be referred to as New Radio (NR) access networks, are currently being developed and are expected to handle a very wide range of use cases and requirements, comprising, among others, mobile broadband (MBB) and machine type communications (e.g., involving IoT devices). For mobile broadband, 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage than the existing 4G network, targeting much higher throughput with low latency and utilizing higher carrier frequencies (e.g., higher than 6 gigahertz (Ghz)) and wider bandwidths. A 5G network also increases network expandability up to hundreds of thousands of connections.

The present patent application provides for systems and methods for integrating the wireless backhaul communications between relay transmission point devices (rTPs) and the access communications between user equipment (UE) and rTPs, including in 5G networks or other next generation networks.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
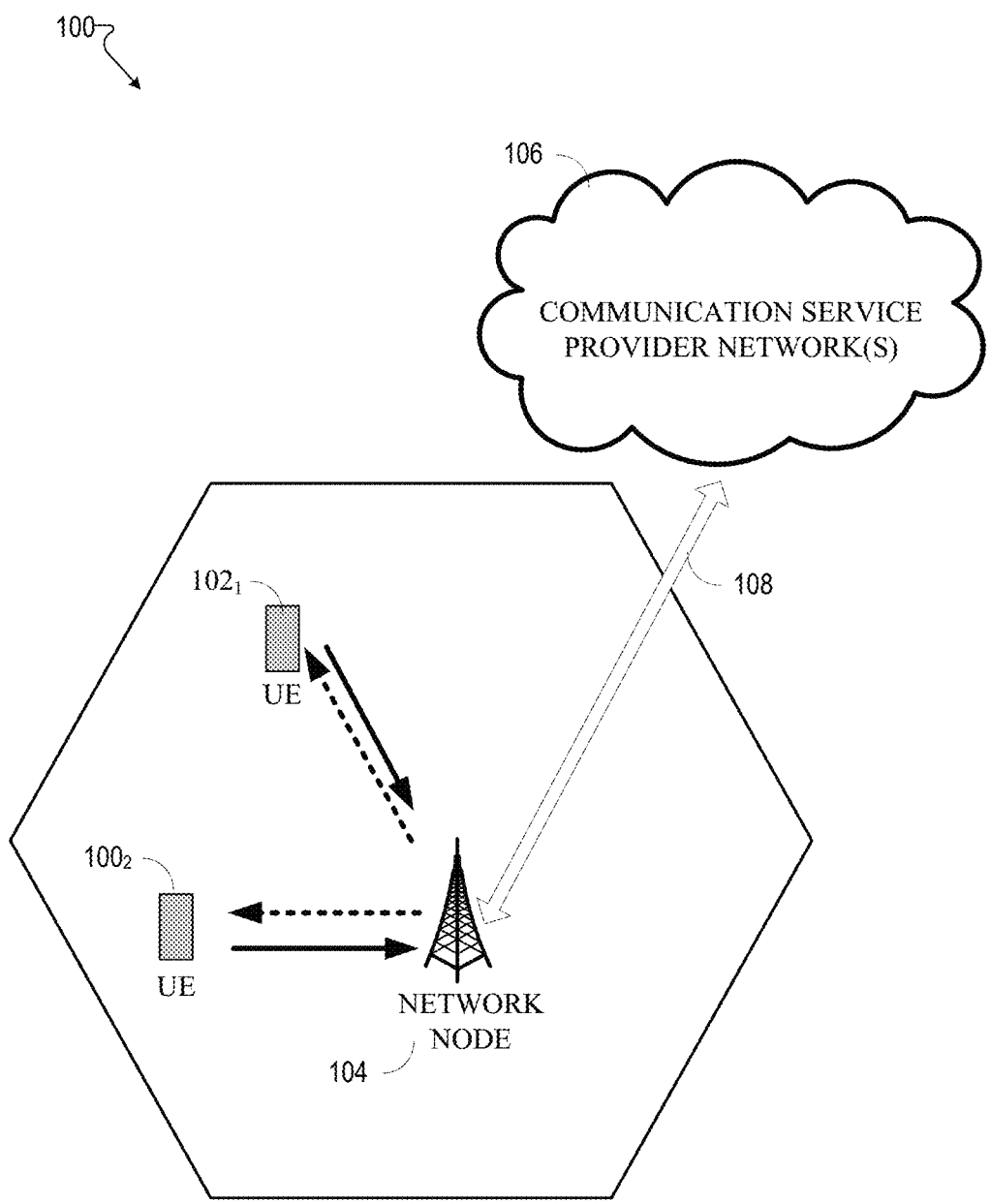
FIG. 1 illustrates an example wireless communication system having a network node device (also referred to herein as a network node) and user equipment (UE) in accordance with various aspects and embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, well-known structures and devices are shown in block diagram form in order to facilitate describing the subject disclosure.

The methods (e.g., processes and logic flows) described in this specification can be performed by devices (e.g., a UE, a network node, etc.) comprising programmable processors that execute machine executable instructions to facilitate performance of the operations described herein. Examples of such devices can be devices comprising circuitry and components as described in FIG. 13 and FIG. 14.

The present application provides for system and methods for integrating the wireless backhaul communications between relay transmission point devices (rTPs) and the access communications between user equipment (UE) and rTPs (integrated access and backhaul (IAB)), including in 5G networks or other next generation networks. In example embodiments, rTPs can multiplex the access links and backhaul links using time division multiplexing (TDM), frequency division multiplexing (FDM), hybrid FDM/TDM, or space division multiplexing (SDM), which can also comprise the transmission of signals/channels utilized as part of initial access. Wireless backhaul communications link connections (referred to herein as backhaul links) can be established through initial discovery of rTPs, initial access by the rTPs, and completion of establishment using a random access channel (e.g., RACH) procedure. The rTPs can be one hop away from a network node, or multiple hops away from a network node (see, e.g., FIG. 5 below). Next, communications between the rTPs, which can include multiplexed access link data and backhaul link data, can proceed, and rTPs can continue to periodically monitor the sync signals for maintenance of the backhaul links (e.g., in response to lost synchronization, connections can be re-established). Periodic radio resource management (RRM) measurements (e.g., reference signal received power (RSRP), beam-specific measurements for route selection, etc.) of the signals on the backhaul links facilitate communications on the backhaul links. Functionality can also comprise radio resource control (RRC) connection establishment and configuration/reconfiguration.

The operability of using transmission schemes (e.g., multiplexing of access/backhaul traffic in time/frequency/space) to increase utilization of backhaul links can allow for ultra-dense deployment of mmWave transmission points (TPs) without having to increase the number of wired transport nodes and connections proportionately, which can allow for increased efficiency and scalability. Additionally, due to the usage of phased array transmissions, access and backhaul links can use the same radio (unlike cellular bands, which would require separate radios), and as such, operation in duplex mode would not be required. Additionally, the system and methods herein can allow for fast route switching (e.g., faster than RRC time scales), which can mitigate blocking in mmWave transmissions. The present systems and methods can also allow for multi-hop scheduling and route optimization, and further, can allow for the re-use of access physical channels and higher layer procedures that can enable for more efficiency.

This section describes various aspects of example operating environments, e.g., wireless communications systems and methods in accordance with the present application, including a typical example of a wireless communications system, a wireless network communications system comprising relay node devices, and different transmission schemes that can be used to integrate access and backhaul communications occurring between UEs and rTPs (which can be either RNs or network nodes). Also described in this section are layer 2 versus layer 3 relay switching, and multi-hop backhauling and multi-site connectivity.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 102₁, 102₂ . . . 102ₙ), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IoT devices that can communicate wirelessly. UE 102 can be a mobile station (MS) in global system for mobile communications (GSM) systems. Thus, the network node (e.g., network node device) provides connectivity between the UE and the wider cellular network and facilitates wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), a network node can be referred to as base transceiver stations (BTS), radio base station, radio network nodes, base stations (BS), NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), an relay, a donor node controlling relay, a base transceiver station (BTS), a transmission point, a transmission node, a remote radio unit (RRU), a remote radio head RRH, nodes in distributed antenna system (DAS), and the like.

System 100 can further include one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cell, additional UEs, network server devices, etc.). The network node 104 can be connected to the one or more communication service provider networks 106 via one or more communications links 108. The one or more communications links 108 can comprise, for example, wired link components, such as a T1/E1 phone line, a digital subscriber line (DSL) (e.g., either synchronous or asynchronous), an asymmetric DSL (ADSL), an optical fiber backbone, a coaxial cable, and the like. The one or more communications links 108 can also include wireless link components, comprising line-of-sight (LOS) or non-LOS links, which can include terrestrial air-interfaces or deep space links (e.g., satellite communication links for navigation).

Wireless communication system 100 can employ various cellular technologies and modulation schemes to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, and resource-block-filtered OFDM. However, various features and functionalities of system 100 are particularly described wherein the devices (e.g., the UEs 102 and the network device 104) of system 100 are configured to communicate wireless signals using one or more multi-carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi-carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading.

Figure 2:
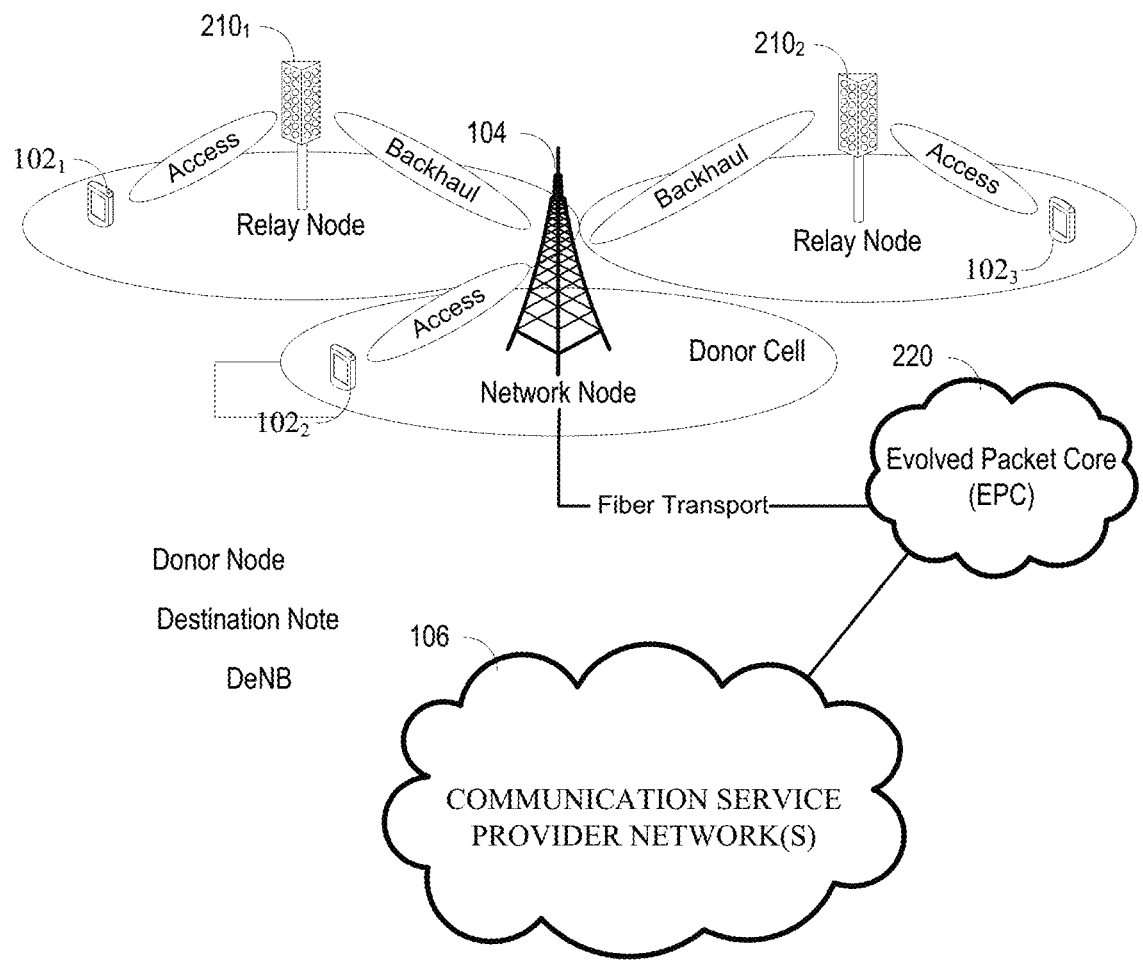
FIG. 2 illustrates an example wireless communication system having a network node device, relay node device (referred to herein as relays, relay nodes, or RNs), and user equipment (UE) in accordance with various aspects and embodiments of the subject disclosure.

FIG. 2 illustrates of an example wireless communication system 100 comprising relay nodes, wherein FIG. 2 shows two example RNs (e.g., RN $210_1$, and RN $210_2$). RNs, typically located at the edge of a network node 104's cell, can aid in meeting the ever-increasing demand for coverage and capacity. In example embodiments, an RN is typically smaller in size than a network node, has lower power consumption, and can connect via a backhaul link to a network node (e.g., network node 104), which, if connected to an RN, can also be referred to as a donor node or a destination node. RNs can enhance the rate of data in the network, can control its own cell (e.g., can have its own cell ID), and can be operable to perform RRM, perform hybrid automatic repeat request (HARQ) retransmissions, and perform various aspects of the air interface (sync signals, and reference signals (RS), scheduling, control channels, etc.) up to mobility management (e.g., handovers). As an example, a UE (e.g., UE $102_1$) can transmit a signal via a wireless access communications link (e.g., access link) to RN $210_1$, which can then relay the signal to the network node 104. Typically, a UE can be connected to either the network node 104, or an RN 210, but not both. In FIG. 2, for example, UE $102_2$, which is in the cell (e.g., donor cell) of the network node 104, can communicate directly with the network node 104.

The network node 104 of FIG. 2 can be operable to provide S1 and X2 proxy functionality (e.g., S1 and X2 functionality) between the RN 210 and other network nodes. The network node 104 can also be operable to communicate via a fiber transport with, for example, an evolved packet core (EPC) 220. The EPC can serve as the interface for connection to networks such as the internet, corporate private networks, IP multimedia subsystems, etc. (e.g., one or more communication service provider networks 106).

The network nodes (e.g., network node 104) and RNs (e.g., RN 210) can be referred to as relay transmission points (rTPs). In the example embodiments of the present application, the backhaul communications between rTPs and the access communications between user equipment (UE) and rTPs, can be integrated. For example, these communications can be multiplexed in the scheduler of an rTP, wherein the scheduler can be operable to determine resource assignments for transmissions between UEs and rTPs, and between rTPs. Typically, schedulers will assign resources based upon numerous criteria (e.g., base station throughput, user latency, fairness, etc.). Depending on factors and conditions (e.g., condition of the channels, number of rTPs and stations in a cell, etc.), the schedulers of the rTPs can be operative to select from a variety of multiplexing schemes so as to integrate the transmission of the backhaul links and access links. For example, referring to FIG. 2, network node 104 can be sending to and receiving signals from both UE $102_2$ and from RN $210_1$. The transmissions can be multiplexed so as to avoid interference.

Figure 3:
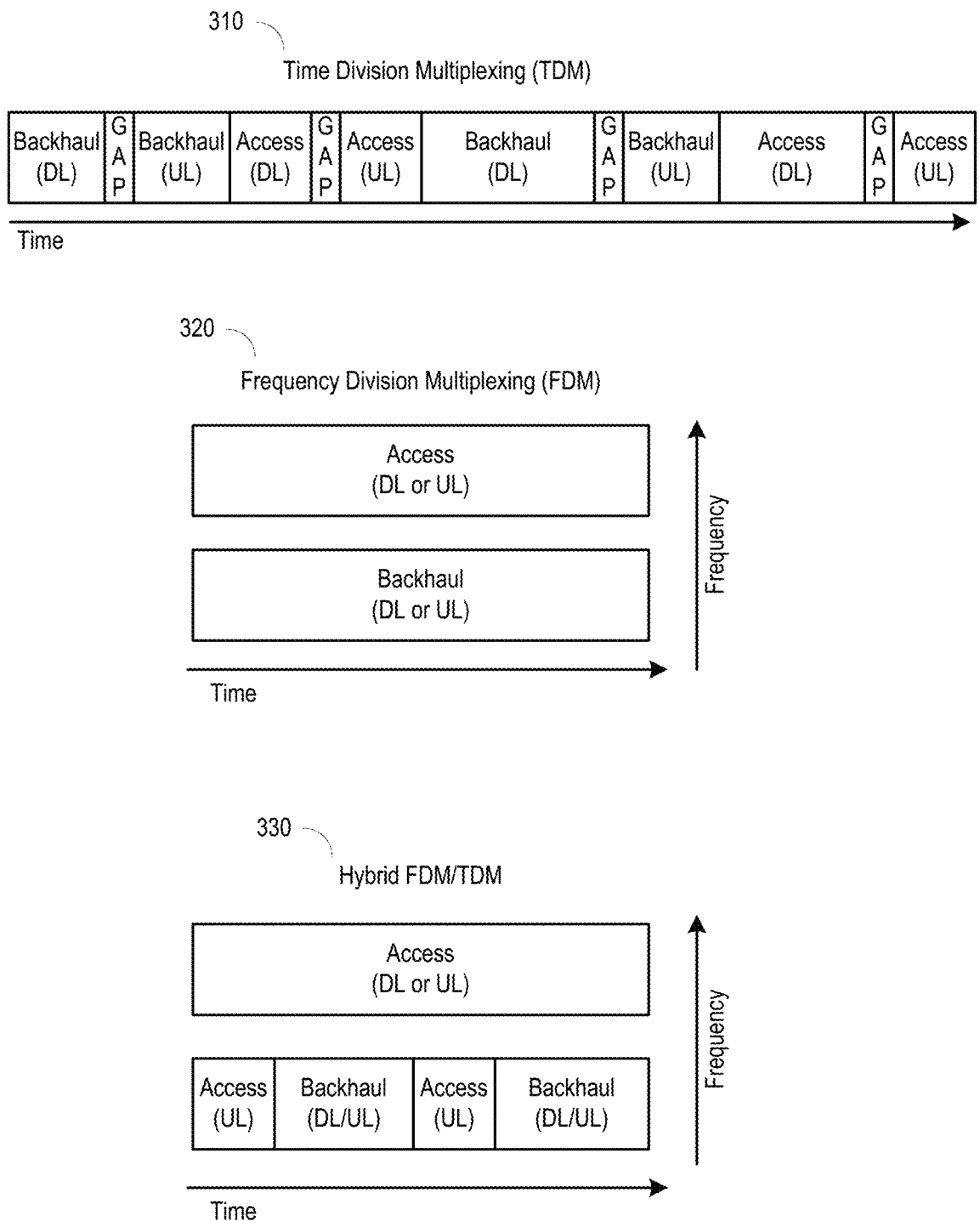
FIG. 3 illustrates examples of various multiplexing schemes that can be employed in accordance with various aspects and embodiments of the subject disclosure.

Some example transmission schemes integrating access and backhaul transmissions are as follows. FIG. 3 shows examples of transmissions employing time division multiplexing (TDM) 310, frequency division multiplexing (FDM), and hybrid FDM/TDM to integrate backhaul (in-band or out of band) and access link transmissions. In the example transaction illustrating TDM, backhaul downlink (e.g., Backhaul DL), backhaul uplink (e.g., Backhaul UL), access downlink (e.g., Access DL), and access uplink (e.g., Access UL) transmissions can occur at different times on the same frequency (guard intervals in between transmission slots can also be employed). Frequency division multiplexing (FDM) schemes can also be employed whereby uplink and downlink transmissions on the access link are made on one frequency, and uplink and downlink transmission on the backhaul link are made on another frequency, thereby allowing the transmissions to occur at the same time. Still referring to FIG. 3, in the example illustrating hybrid FDM/TDM, uplink and downlink access transmissions can be transmitted on one frequency, while other access and backhaul uplink and downlink transmissions with assigned time slots are transmitted on another frequency. While not shown in FIG. 3, in addition to time and frequency, the transmissions can also be multiplexed in space. Beamforming and directional transmissions can allow for transmissions in the same frequency and time, but directed spatially in a different direction or magnitude so as to reduce interference.

Figure 4:
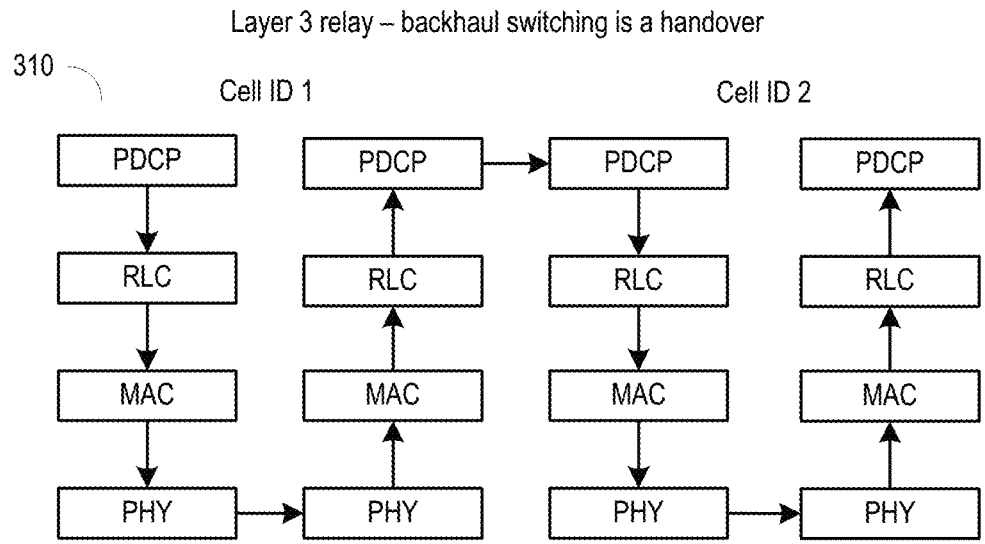
FIG. 4 illustrates user plane protocol stack diagrams showing some of the different protocol layers for a layer 3 relay and a layer 2 relay devices in accordance with various aspects and embodiments of the subject disclosure.
Figure 4:
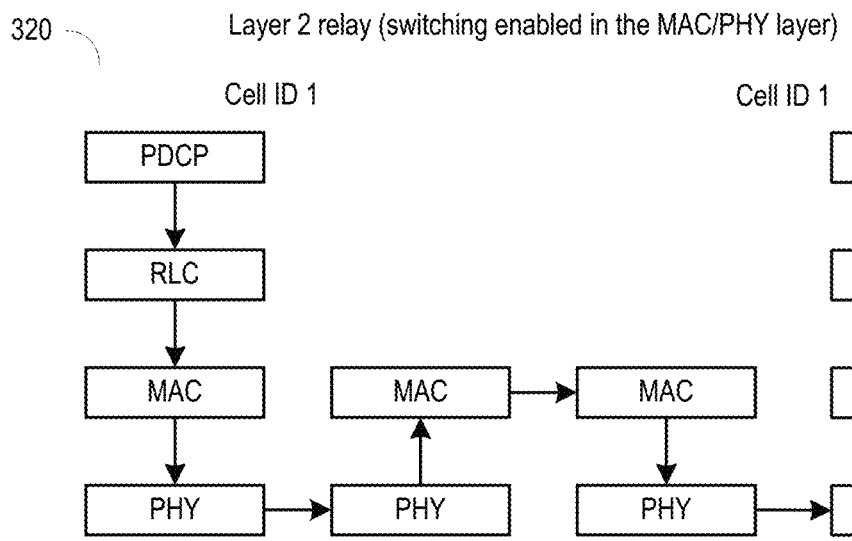

With respect to layer 2 vs. layer 3 relay switching, FIG. 4 illustrates user plane protocol stack diagrams showing some of the different protocol layers for a layer 3 relay and a layer 2 relay, which can be used to illustrate the difference between layer 3 and layer 2 relay switching. The physical layer (PHY) layer is responsible for coding/decoding, modulation/demodulation, multi-antenna processing, and mapping of signals to the appropriate physical time-frequency resources. Mapping of transport channels to physical channels is also handled at the PHY layer. The media access control MAC layer is responsible for multiplexing of radio link control (RLC) protocol data units, HARQ retransmission (e.g., error correction through HARQ), scheduling for uplink and downlink, logical channel prioritization. The RLC layer is in charge of segmentation, concatenation, ARQ retransmission (e.g., error correction through automatic repeat request (ARQ)) and in-sequence delivery to higher layers. The packet data convergence protocol (PDCP) layer is in charge of compression of the IP header of user packets (e.g., using the robust header compression (RoHC) protocol) to reduce the number of bits transmitting over the radio interface, PDCP is ciphering, integrity protection for the C-plane, in-sequence delivery and retransmission of PDCP service data units (SDUs), and duplicate detection.

Still referring to FIG. 4, with layer 3 relay switching, each TP has its own cell ID. TP switching (route switching) involves RRC signaling and is visible to the core. Layer 3 relay switching is also simpler to implement. Layer 3 relay switches however, do not allow switching that is as fast as layer 2 relay switching. As shown in the diagrams, layer 2 switching can be performed at the MAC layer, which can make it more suitable for mmWave transmissions, as the faster switching can mitigate blocking. Thus, in example embodiments, layer 2 relays with switching enabled in the MAC (or PHY) layer can be used to enable fast TP switching to mitigate short term blocking.

Figure 5:
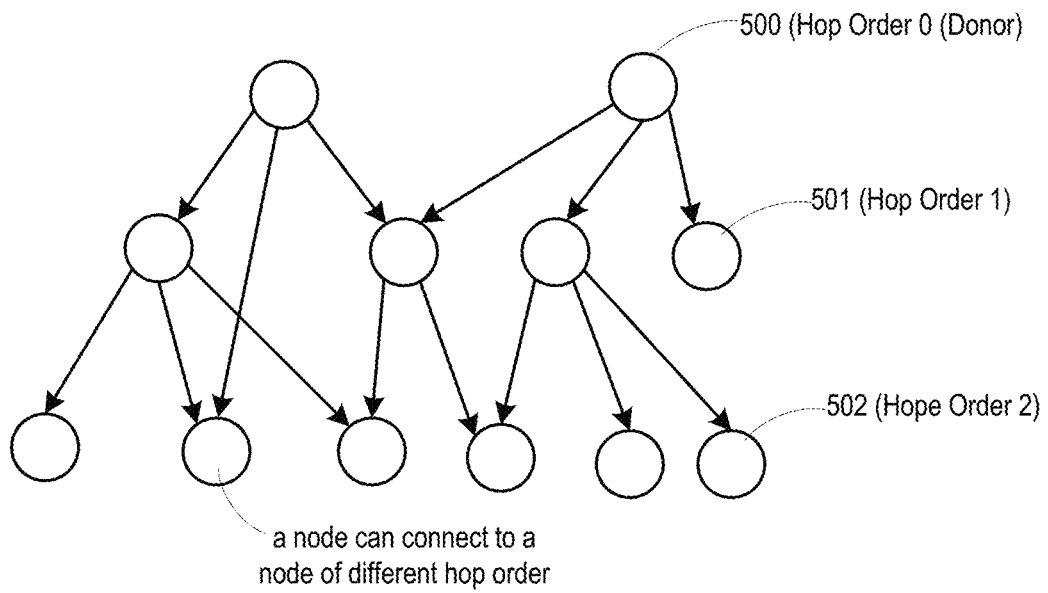
FIG. 5 illustrates rTPs having different hop orders, in accordance with various aspects and embodiments of the subject disclosure.

With respect to multi-hop backhauling and multisite connectivity and now referring to FIG. 5, example embodiments of the present application can provide for multi-hop backhauling and multi-site connectivity. That is, the integration of backhaul link and access link transmissions can take into account hop order. The hop order (e.g., node order) of a node indicates the number of hops it is away from a donor node. FIG. 5 shows the topology of a network as a relational graph based on edges and nodes, wherein each circle represents an RN, or network node that is a donor node (e.g., network node 104 connected via a fiber link to an EPC 220). In FIG. 5, node 500 is a donor node, node 520 is a RN of hop order 1 (e.g., one hop away from node 500), and node 502 is an RN of hop order 2 (e.g., 2 hops away from node 500). Thus, an RN can have more one or more RNs between it and a donor node, and each node can connect to multiple nodes in different hop orders.

Having described the operating environment for example embodiments in accordance with the present application (e.g., network nodes, relay nodes of different hop orders, access links, backhaul links, multiplexing schemes, etc.), functionalities are now described.

Aspects relating to discovery, initial access and connection establishment are not described. In example embodiments, the system can be operable to provide for initial access that comprises functionality for the detection of wireless network (e.g., a 5G network) cells, which may be operated as multiple rTPs with a shared ID, to achieve time/frequency synchronization with that cell. In example embodiments, a UE can discover (e.g., search for, listen for) synchronization signals (sync signals) transmitted from rTPs, and then use a RACH procedure to complete the initial access and connection establishment.

With respect to discovery using multiplexed synchronization signals, in example networks, time/frequency synchronization can be accomplished by using periodic transmissions of synchronization signals (sync signals). As an example in which a UE (e.g., UE 102) synchronizes and establishes a connection to a network node, a UE can first conduct a cell search for (or listen for) sync signals transmitted periodically by, for example, a network node (e.g., network node 104). The UE is operable to receive these sync signals, which can be a primary sync signal (PSS) and secondary sync signal (SSS), and can also be operable to receive the broadcast channel (BCH). The sync signals provide the cell ID to the UE (e.g., LTE supports hundreds of different cell IDs), as well as other information. The BCH carries the master information block (MIB), which contains information such as the actual cell bandwidth. After decoding the synchronization signals, the UE finishes the initial synchronization and can establish the connection to the network node.

With regards to example embodiments of the present application, in which both UEs and rTPs can synchronize and establish a connection, instead of transmitting a single fixed periodic synchronization signal, or having a common period for the transmission of sync signals, example embodiments can be operable to allow for a UE-specific, or at least cell specific, configurability of at least the transmission period of the signals utilized for initial access. This operability can support forward-compatible introduction of new services with potentially different requirements (e.g., integrated access and backhaul communications). While the same physical signals can be used for both UE and rTRP discovery (including by using the same cell ID), differentiation and independent configuration of the resources and/or transmission period(s) of the signals used for initial access for UEs and rTRPs can be employed (e.g., time/frequency resources used for backhaul could be different or be independently configured from the time/frequency resources used for access UEs). As mentioned above, multi-hop backhauling and multi-site connectivity can be supported, and thus not only can there be differentiation between resources used for transmission of access and backhaul link initial access signals, but also between different hop orders of rTPs.

Sync signal transmission for access and backhaul links can be comprised of one or more signals carrying (virtual) cell/TP-specific IDs for discovering other nodes in the network (e.g. PSS/SSS/ESS/xSS). These sync signals for access and backhaul links can be multiplexed (e.g., as described above with respect to FIG. 3 and its corresponding text). In example embodiments, a hop-order based hierarchy can accommodate half duplex constraints between rTPs (transmissions for access UEs however are not necessarily subject to the same constraint). Due to analog beamforming, time-domain multiplexing can be used, although RF implementations might support multiple analog beams simultaneously. The multiplexing of access and backhaul links during the initial access procedure can be a procedure that is transparent to UEs. A UE should only need to be aware of the signals required for its own cell discovery and synchronization procedures, and the configuration/transmission of additional resources for other purposes (e.g. for IAB) and not intended for the UE, is transparent from the UE's perspective. This facilitates forward compatibility as well as simplifies the procedure at a given UE in a system, which may support multiple different use cases and functionalities such as IAB simultaneously. One mechanism for supporting this is to perform resource allocation for signals related to initial access, synchronization, and beam management in a UE-specific manner, wherein each UE can receive its own independent configuration that is not broadcast to all UEs in a given cell. In addition, UEs may not be aware of beam sweeping of initial access signals including those used for providing SS transmissions for backhaul links The physical IDs (e.g., of the rTPs) conveyed by the sync signal transmissions for the access links can be reused for the backhaul links or may be independent. Reusing the same ID for both access and backhaul links can avoid the need for ID partitioning and can avoid confusion at the UE (e.g., if a UE measures an ID of an rTP that is not a valid ID for access links). The identification of separate rTP IDs which share the same (virtual) cell ID can facilitate route selection (allows rTPs to distinguish from each other). In some example embodiments, ("implicit"), time/frequency/space resource (e.g., symbol or PRB (physical resource block) or beam index) of the SS transmission is mapped to a unique rTP ID. In other examples ("explicit"), sync signal transmission (and/or RACH preambles) can be used to convey unique rTP IDs (see below). In other example embodiments ("higher layer"), unique rTP ID can be conveyed by higher layer messages which are mapped to a set of physical beam indexes. As mentioned above, the BCH, which is the same mechanism that can provide for a set of system information, can be used for both access and backhaul link sync signal transmission, wherein higher layers may indicate whether additional system information might be provided in the case of backhaul link establishment (e.g., mobility info or UE-service specific information might not be provided).

Figure 6:
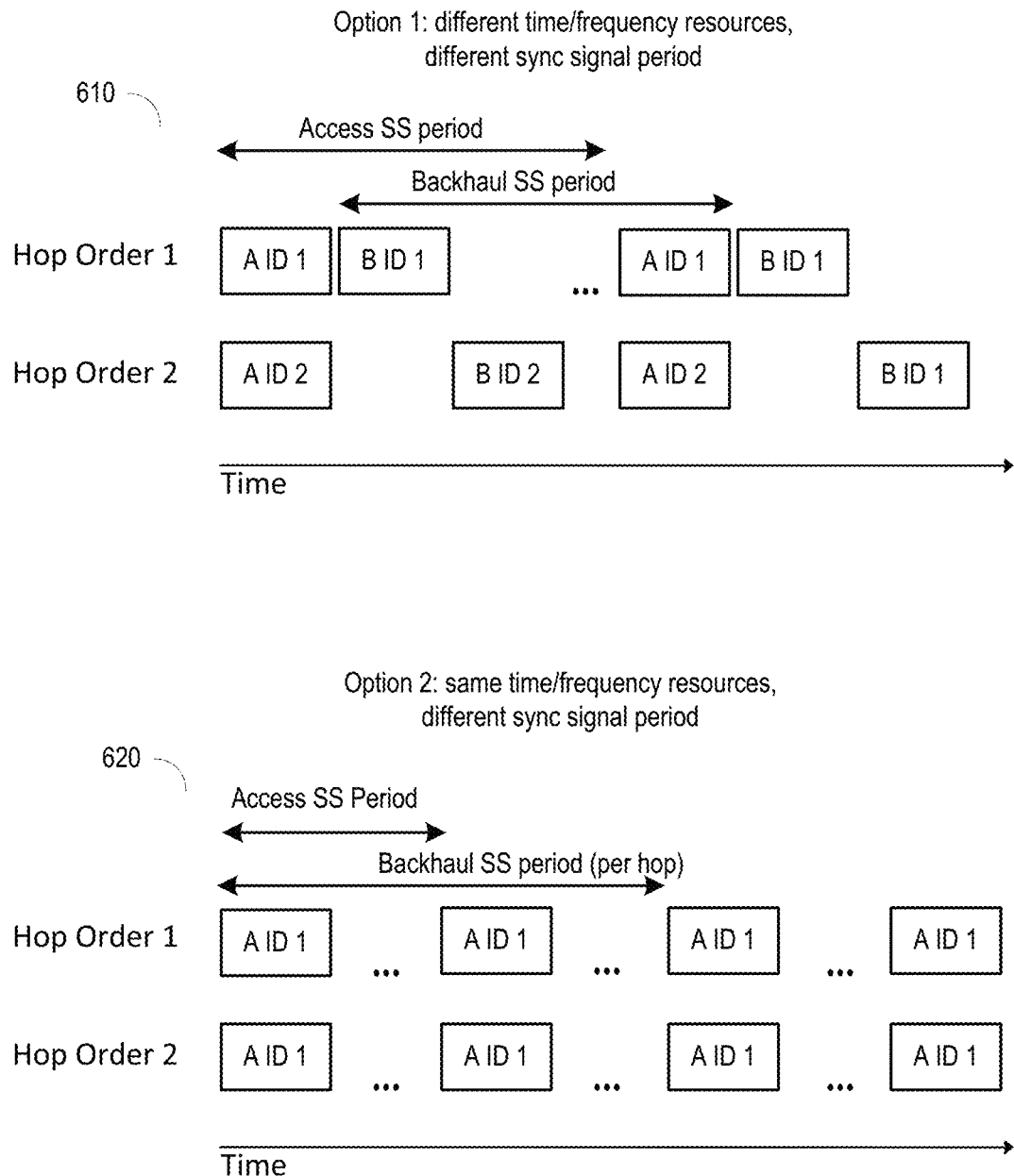
FIG. 6 illustrates diagrams of examples in which wireless backhaul communications and access communications can be integrated, in accordance with various aspects and embodiments of the subject disclosure.

FIG. 6 depicts two examples of TDM of access and backhaul sync signal transmissions. The sync signals may be at a subframe or symbol level. As shown in FIG. 6, diagram 610 depicts an example (Option 1) in which different time/frequency resources can be used for access and backhaul sync signals. Each hop order may have a different offset for the backhaul signals from the access signals, and different sync signal periods between access and backhaul signals. As shown in diagram 610, an rTP of hop order 1 rTP can transmit sync signals (e.g., "A ID 1" and "B ID") on the same frequency at different time slots. Meanwhile, a hope order 2 rTP can transmit access and backhaul sync signals (e.g., "A ID 2" and "B ID 2") on a separate frequency at different time slots within the frequency. Here, even though each transmission of the rTPs 1 and 2 have different time slots within each rTP's respective frequencies, each uses a different sync signal period between access and backhaul signal transmissions.

Still referring to FIG. 6, diagram 620 depicts an example (Option 2) in which the same time/frequency resources are used for access and backhaul sync signals. Each hop uses a different subset of those signals. The sync signal period may or may not be different between access and backhaul. As shown in diagram 620, a hop order 1 rTP can transmit access sync signals (e.g., "A ID 1") and backhaul sync signals (B ID 1), or in some time intervals, can transmit either (e.g., "A/B ID 1") access or backhaul sync signals.

Other options can also be employed, such as bidirectional transmission of relay sync signal transmissions. For example, for rTPs of order n, backhaul sync signal transmissions of order n, n+1, n−1 can be monitored.

In example embodiments, the RACH procedure can be used by UEs and rTPs to complete initial access and connection establishment of integrated access and backhaul links. The physical channels and signals used for RACH can be reused, and in alternative example embodiments, the entire procedure for the rTPs is not the same as for the UE.

In some example embodiments, the rTP relay connection(s) are contained within the radio access network (RAN) and the core network (CN) is not involved. One mechanism for allowing the differentiation of rTP and UE initiation can be to have different RACH preambles utilized by rTPs as UEs. The partition of resources can be indicated by RRC configuration or fixed in the specification. The partition of RACH preambles can further be divided between rTPs on the basis of topology (e.g. a different subset can be used by rTPs of different hop-orders). The preambles selected by an rTP can be unique from that of other rTPs (e.g. preconfigured), or a contention-resolution procedure can be utilized.

Additionally, RACH resources for rTPs can be multiplexed (e.g. TDM/FDM) with similar partitions (e.g. hop-order based), as they were for the sync signal transmissions, including subframe or symbol-based multiplexing.

Example embodiments of UEs and rTPs in accordance with the present application can be operable to perform a typical RACH procedure for UEs performing random access for the first time in a network/cell, or as fallback if the connection is lost. For some other scenarios such as CONNECTED or INACTIVE UEs, such UEs and rTPs can be operable to perform a simplified RACH procedure. In addition, such a simplified RACH procedure can be employed for other use cases such as IAB, where backhaul links are to be maintained, but mobility is limited (or not supported).

Figure 7:
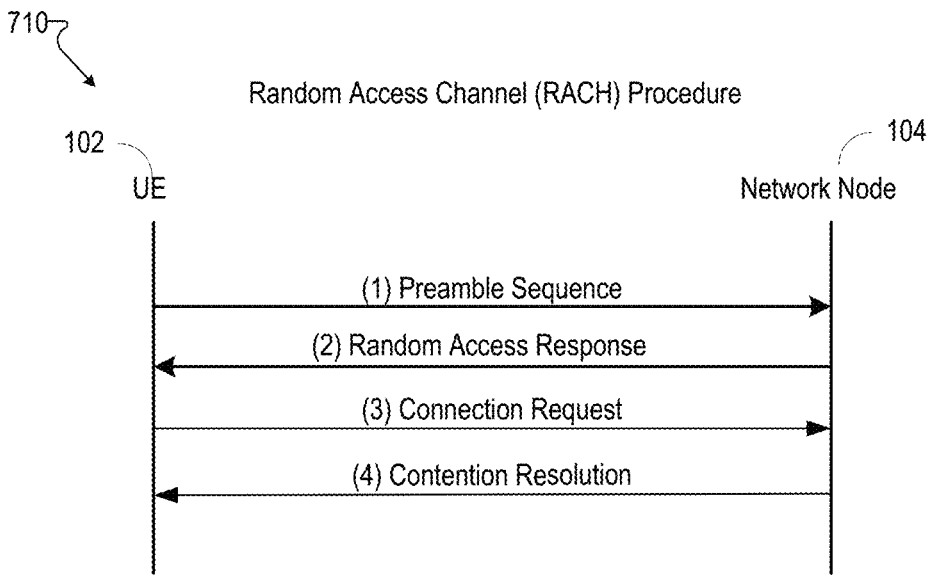
FIG. 7 illustrates transaction diagrams of example random access channel (RACH) procedures that can be employed in accordance with various aspects and embodiments of the subject disclosure.
Figure 7:
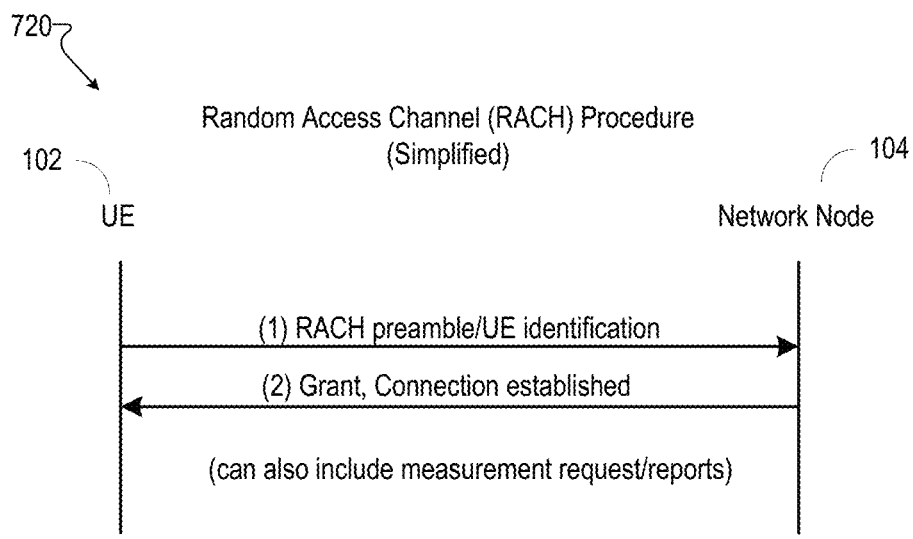

FIG. 7 illustrates examples of both a typical RACH procedure 710 and a simplified RACH procedure 720 in accordance with example embodiments of the present application. In procedure 710, after synchronization, a UE (e.g., UE 102), can at transaction (1) transmit a RACH preamble sequence to the network node (e.g., network node 104) to which it is synced. At transaction (2), in response to the transmission by the UE, the network node can transmit back a random access response to the UE, which assigns the UE another identity (e.g., cell radio network temporary identity (C-RNTI)), a timing advance (TA) value (e.g. timing offset) so that it can compensate for the round trip delay cause by UE distance from the network node, and an uplink grant resource that assigns initial resources to the UE for using the uplink shared channel (UL-SCH). At transaction (3), using the UL-SCH, the UE sends a connection request message (e.g., an RRC connection request message) to the network node, which can contain the UE identity and connection establishment cause. At transaction (4), in response to the connection request, the network node can response with a contention resolution message to UE whose message was successfully received in transaction (3), wherein the contention resolution message contains the new C-RNTI which can be used for further communications.

Referring to FIG. 7, the simplified RACH procedure 720 diagram depicts a two-step RACH procedure (non-collision scenario) that can reduce to reduce latency and network overhead. At transaction (1), the UE sends to the network node a RACH preamble and/or message containing (configured) UE identification. This message can also include a beam recovery request or measurement reports. In response to this message, at transaction (2), the network node responds by sending a connection establishment message, including timing advance (TA) and or UL transmission grant.

In addition to the typical RACH procedure and the simplified RACH procedure, a hybrid approach can also be supported, where both procedures are possibly supported under different conditions.

Once the random access procedure is complete, then data transmission (e.g., further communications) using the integrated wire backhaul transmission links and access links can proceed.

Figure 8:
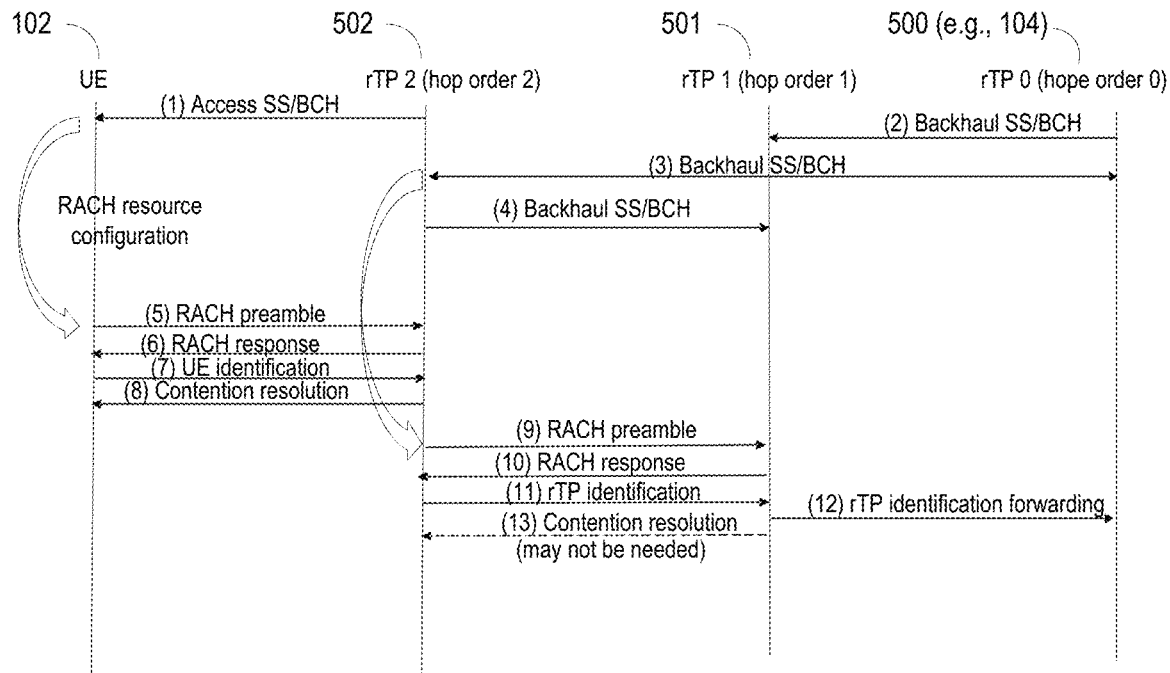
FIG. 8 and FIG. 9 illustrate transaction diagrams showing two examples of synchronization and random access channel procedures used to initialize and establish connections for integrating wireless backhaul communications and access communications in accordance with various aspects and embodiments of the subject disclosure.
Figure 9:
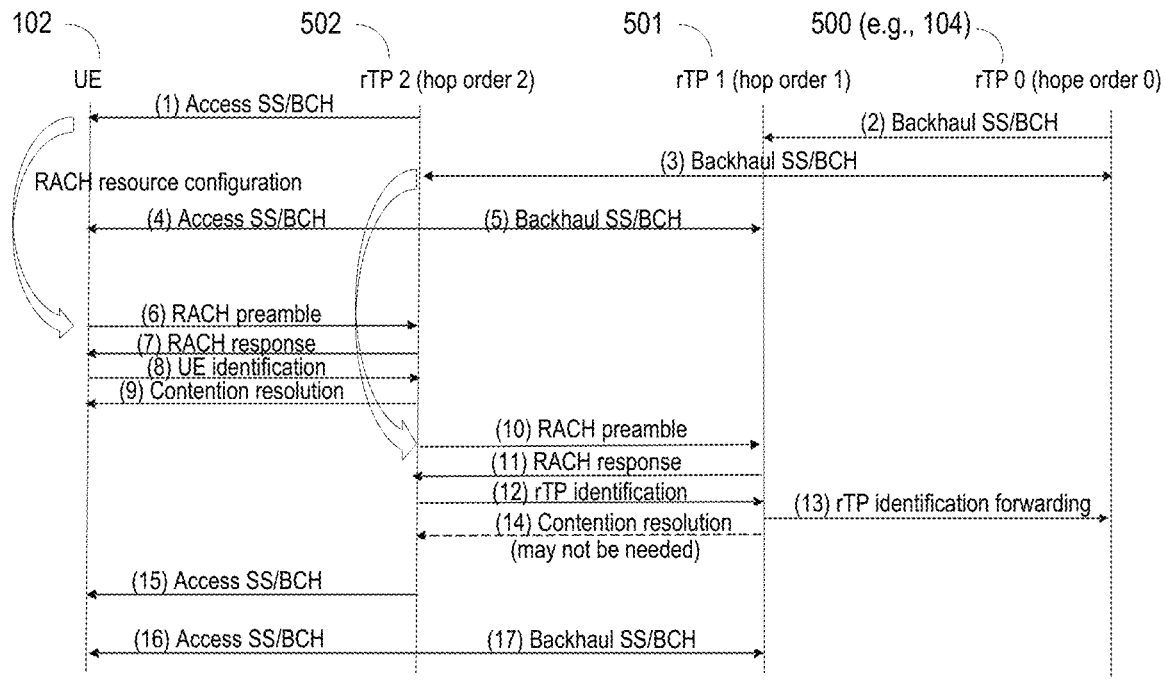

With respect to synchronization and initial access procedures, FIG. 8 and FIG. 9 show transaction diagrams involving synchronization and RACH procedures for a UE and multiple rTPs (e.g., wherein a network node is an rTP of hop order 0, and wherein RNs are of other hop orders) of different hop orders.

FIG. 8 illustrates example interactions between a UE (e.g., UE 104), an rTP of hop order 2 (e.g., rTP 502), an rTP of hop order 1 (e.g., rTP 503), and an rTP of hop order 0 (e.g., rTP 500, network node 104) in which different time/frequency resources are used for access and backhaul sync signals (e.g., FIG. 6, option 1 also illustrated this scheme). Here, in transaction (1), access sync signals and BCH are sent by the rTP 502 to UE 102. In transaction (2), (3), and (4) backhaul sync signals and BCH are also sent between the rTPs of different hop orders. Essentially, each rTP is sending sync signals and BCH to a device that is one hop away. In the example shown, in response to receiving the access synch signal and BCH from rTP 502, UE 102 will, based on the RACH resource configuration, selects a RACH resource and/or a preamble. At transactions (5), (6), (7) and (8), the UE undergoes the RACH procedure with rTP 502, wherein the RACH procedure can be as described above. In response to receiving backhaul sync signals and BCH of transaction (3), in transactions (9), (10), and (11), rTP 502 and rTP 501 send and receive RACH procedure signals. Prior to responding to a contention resolution signal, rTP 501 can at transaction (12) forward the rTP identification of transaction (11) to rTP 500. In this example, in transaction (13), rTP 501 can send a contention resolution signal. In the case in which the simplified RACH procedure is used, transaction (13) may not be needed. Thus, in various manners, synchronization and initialization and connection establishment can occur between not just the UE and an rTP, but between multiple rTPs of different hop orders as well.

FIG. 9 shows a transaction diagram involving a UE (e.g., UE 102) and several rTPs (e.g., rTP 502, rTP 501, and rTP 500) in which the same time/frequency resources are used for access and backhaul sync signals (FIG. 6, option 2 also depicts the same scheme). Each hop uses a different subset of those signals, and the SS period may or may not be different between access and backhaul. In transaction (1), access sync signals and BCH are sent by the rTP 502 to UE 102. In transaction (2) and (3) backhaul sync signals and BCH are also sent between the rTPs of different hop orders. In transaction (4) and (5), rTP 502 sends another access sync signal and BCH to UE 102, and at the same time, sends a backhaul sync signal and BCH to rTP 500. Each rTP is sending sync signals and BCH to a device that is one hop away. In the example shown, in response to receiving the access synch signal and BCH from rTP 502, UE 102 will, based on the RACH resource configuration, selects a RACH resource and/or a preamble. At transactions (6), (7), (8) and (9), the UE undergoes the RACH procedure with rTP 502, wherein the RACH procedure can be as described above. In response to receiving backhaul sync signals and BCH of transaction (3), in transactions (10), (11), and (12), rTP 502 and rTP 501 send and receive RACH procedure signals. Prior to responding to a contention resolution signal, rTP 501 can at transaction (13) forward the rTP identification of transaction (11) to rTP 500. In this example, in transaction (14), rTP 501 can send a contention resolution signal. In the case in which the simplified RACH procedure is used, transaction (14) may not be needed. Thus, in various manners, synchronization and initialization and connection establishment can occur between not just the UE and an rTP, but between multiple rTPs of different hop orders as well. After connection establishment, the rTPs can continue to periodically monitor the sync signals for maintenance of the links. If the sync is lost, then the access procedures can be re-established the access procedure. Transactions (15), (16), and (17) are example transactions that illustrate this sync maintenance phase.

With respect to RRM measurements and RRC configuration, periodic measurements on DL signals can support mobility and cell (which may be operated as multiple TRPs with a shared ID) reselection. In LTE this is accomplished by periodic transmission of 'always on' signals (e.g. PSS, SSS, cell-specific reference signals (CRS)). For supporting a single use case (e.g. mobile data), the transmission of the required signals can be optimized and to a single (fixed) periodic timing which simplifies the measurement procedure at the UE.

However, a fixed timing poses challenges when considering forward-compatibility, as it implies that other future use cases or features must either utilize the same timing (which may not be optimal as discussed below) or might need additional transmissions to be multiplexed with the existing transmissions. This can reduce the overall resource utilization efficiency of the system, or even worse, pose backwards compatibility issues with legacy devices that are not expecting transmissions of additional signals.

Instead, just as is proposed for signals related to initial access, the transmission of a reference signal (RS) used for measurement and subsequent report may be configured periodically or instead transmitted "on-demand," at a different time scales to support different levels of mobility or link management supported by the network which can also be UE-specific.

One example can be when network assistance for mobility can be provided (e.g. by LTE in the case of non-standalone operation) or to support link management between TRPs in the case of IAB.

Example embodiments can operable to support multiple types of physical channel measurements for RRM—both to measure link strength and interference using the same or different measurement reference signals (RS). These measurements can comprise, for example, Cell ID based measurements (e.g. reference signal received power (RSRP), received signal strength indicator (RSSI) on (virtual) cell-specific RS). These measurements can also comprise, for example, beam-based measurements (e.g. RSRP/RSSI on beam-specific RS).

The transmission of the RS used for measurement and subsequent report can be periodic and or "on-demand" (e.g. in an rTP-specific manner and triggered by the receiving or target TP) at a different time scale than access due to the different channel dynamics and no or limited mobility of rTPs. The measurement and report configuration can be independent of the one used for access (e.g. separate duration and inter-transmission/measurement period). The measurement and report periodicity can be X times of the access configuration. Additionally, backhaul RRM reports can indicate 'on-demand' based on target or receiving rTP measurement triggers.

During initial access and after link establishment, an rTP can be operable to monitor multiple links from a set of candidates (e.g. based on SS detection) and be periodically maintained (e.g. RRM reports or other quality metrics). The set of candidates can also be maintained based on multiple factors, such as relay topology (e.g., the rTP monitors X links for hop order n, Y links for n+1, and Z links for n−1, where n is the rTP hop order), link quality (e.g., rTP monitors X links with link quality measurement or benefit metric meeting greater than or equal to a configured or predefined value Y), and UE connections (e.g., an rTP monitors X links that are selected as part of a route(s) that serves a given UE or set of UEs).

Figure 10:
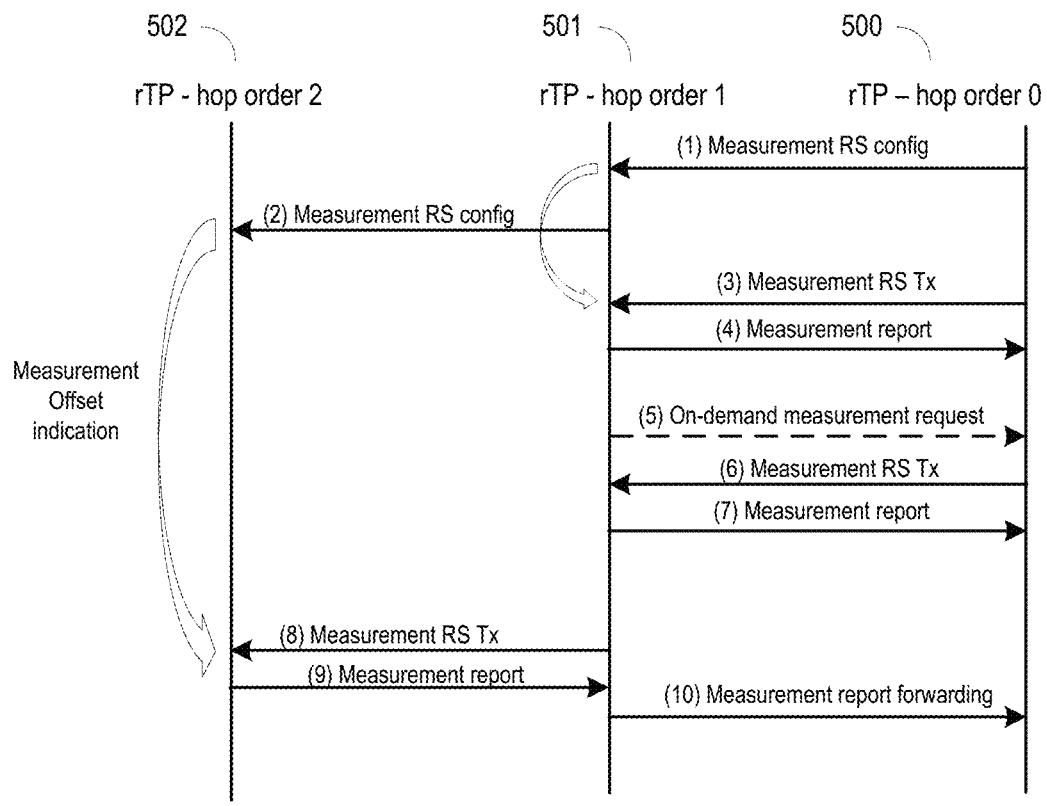
FIG. 10 illustrates a transaction diagram showing an example of measurements that can be used to maintain the integrated wireless backhaul communications links and access communications links in accordance with various aspects and embodiments of the subject disclosure.

FIG. 10 illustrates an example in which rTPs (e.g., rTP 500, rTP 501, and rTP 502) monitors the signals between rTPs. In example embodiments, a first rTP transmits a measurement reference signal (RS) configuration message to a second rTP so that the rTP can be configured to evaluate a measurement RS for the rTP to measure. Subsequently, the first rTP can transmit a measurement RS to the second rTP. The second rTP can measure the measurement RS based on the resource configurations received from the first rTP. The second rTP can then send a measurement report to the first rTP. The measurement report can be used by the first rTP to determine applicable modulation and coding schemes for transmissions between the first rTP and the second rTPsyn.

Referring to FIG. 10, in transaction (1) and transaction (2), measurement RS configuration messages can be sent from, for example, rTP 500 to rTP 501, and from rTP 501 to rTP 502. Before rTP 501 sends a measurement RS transmission to rTP 502 at transaction (8), rTP 501 can receive a measurement RS transmission from rTP 500, and provide a measurement report to rTP 500. FIG. 10, at transaction (5), also shows an example in which an on-demand measurement request can be sent (e.g., sent by rTP 501), and at transaction (6) the receiving rTP (e.g., rTP 500) can respond to it by transmitting a measurement RS. Measurement reports can also be forwarded. For example, at transaction (8), after rTP 501 transmits a measurement RS, rTP 502 can at transaction (9) send back a measurement report, which at transaction (1) is forwarded to rTP 500.

In example embodiments, parameters of the RRC configuration used for enhanced mobile broadband (eMBB)/ultra-reliable low-latency (URLLC) data access can be utilized in the RRC configuration for the rTP relay link configuration. Additional backhaul specific parameters may additionally be employed, such as topology maintenance (e.g., hop order, number connections supported, relay/route ID), route maintenance (e.g., backhaul link quality/benefit metric configuration), backhaul resource allocation (e.g., multiplexing/partitioning of resources per hop-order (e.g. TDM/FDM split)), and network slice provisioning for backhaul links (e.g. TDD config, frequency allocation, QoS parameters etc.).

Figure 11:
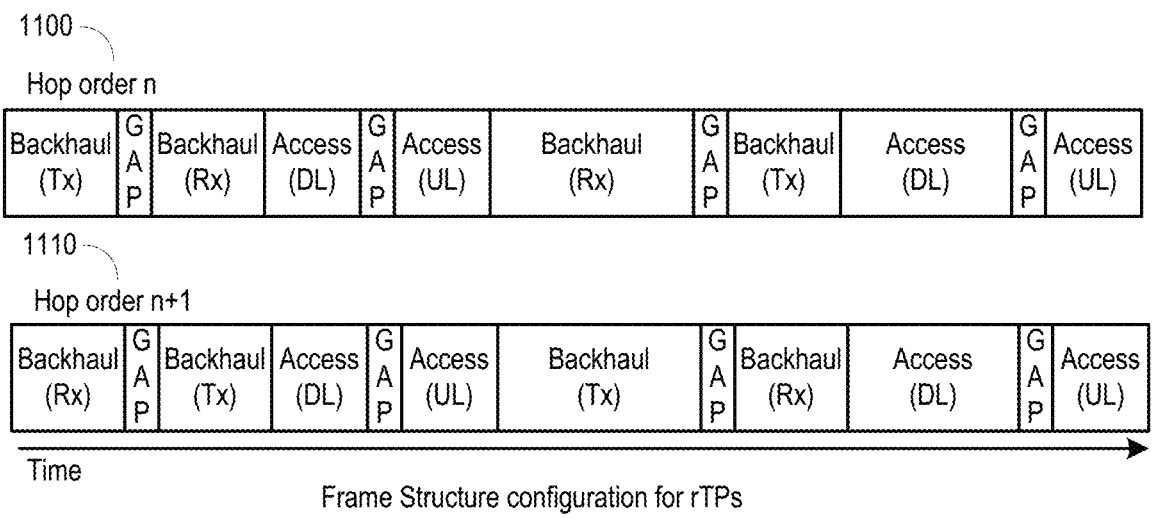
FIG. 11 illustrates an example frame structure configuration for rTPs in accordance with various aspects and embodiments of the subject disclosure.

FIG. 11 shows an example frame structure configuration for rTPs. The frame structures for hop order n rTP 1100 and hop order n+1 rTP 1110 can have backhaul transmission (e.g., Backhaul Tx), backhaul reception (e.g., Backhaul Rx), access downlink (e.g., Access UL), and access downlink (e.g., Access UL) frames, as well as gaps. RRM measurements for backhaul link monitoring can be configured with a separate configuration than for access links. The configurations can be provided, for example, by another rTP (e.g. master rTP or rTP of hop order n−1 where n is the hop order of the target rTP). The configurations can be provided, for example, by a controller entity (e.g. SDN/SON entity managing rTP RAN configuration). Or, a predefined RRC configuration can be used (e.g. from the RRC or by O&M specifications).

Figure 12:
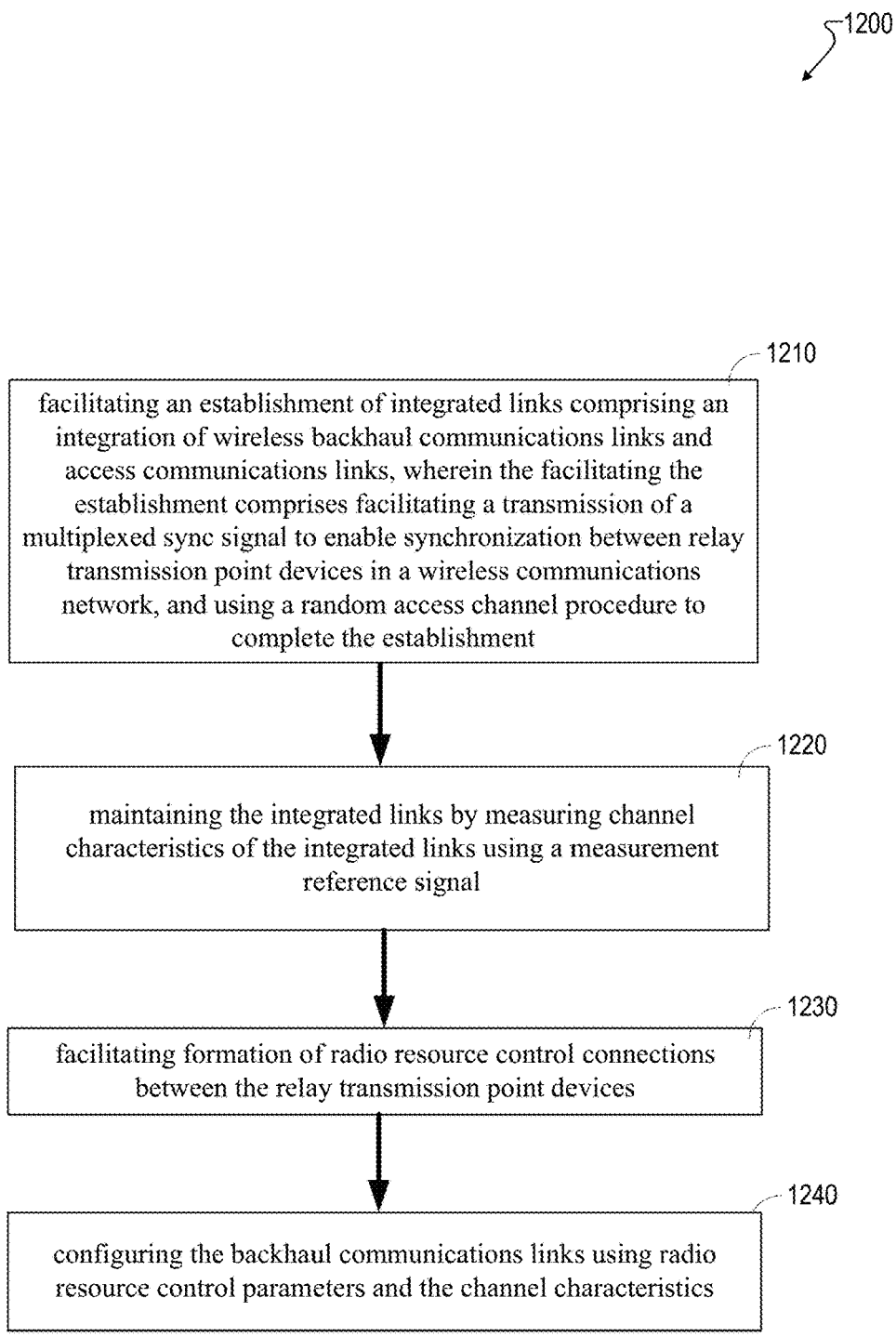
FIG. 12 illustrates an example method that can be performed by rTPs in accordance with various aspects and embodiments of the subject disclosure.

In non-limiting embodiments, a system (e.g., rTPs) is provided, comprising a processor and a memory that stores executable instructions that, when executed by the processor, facilitate performance of operations as illustrated in flow diagram 1200 of FIG. 12. As shown at 1210, the operations can comprise facilitating an establishment of integrated links comprising an integration of wireless backhaul communications links and access communications links. The facilitating the establishment can comprise facilitating a transmission of a multiplexed sync signal to enable synchronization between rTPs (e.g., network node 104, RN 210, RN 500, RN 501, RN 502), and using a RACH procedure to complete the establishment. The sync signals can be multiplexed, for example, using schemes described in FIG. 3 and the descriptions corresponding to FIG. 3. The rTPs comprising RNs can be, for example, a layer 2 relay, which can operable to provide switching at the PHY or MAC level. The rTPs can have different hop orders (as shown in FIG. 5). The RACH procedure can be a full RACH procedure, or a simplified RACH procedure, as described in FIG. 7. Examples of establishment can be as described in FIG. 6, and FIGS. 8 and 9.

As shown at 1220, the operations can comprise maintaining the integrated wireless backhaul communications links and access communications links by measuring channel characteristics of the backhaul communications links using a measurement reference signal. Measuring the channel characteristics comprises measuring for link strength, as well as measuring for interference. The characteristics can be obtained using beam-based measurements. The characteristics can also be obtained by using channel characteristics. The measurement reference signal can be transmitted on-demand. An example of step 1220 can be as show in FIG. 10 and the descriptions corresponding to FIG. 10.

As shown in FIG. 12 at 1230, the operations can comprise facilitating formation of radio resource control connections between the relay transmission point devices, and the operations can also comprise, as shown in FIG. 12 at 1240, configuring (and reconfiguring) the backhaul communications links using radio resource control parameters and the channel characteristics. As mentioned above, the parameters can be utilized in the RRC configuration for the rTP relay link configuration. Additional parameters can also be employed, such as topology maintenance (e.g., hop order, number connections supported, relay/route ID), route maintenance (e.g., backhaul link quality/benefit metric configuration), backhaul resource allocation (e.g., multiplexing/partitioning of resources per hop-order (e.g. TDM/FDM split)), and network slice provisioning for backhaul links (e.g. TDD config, frequency allocation, QoS parameters etc.).

Figure 13:
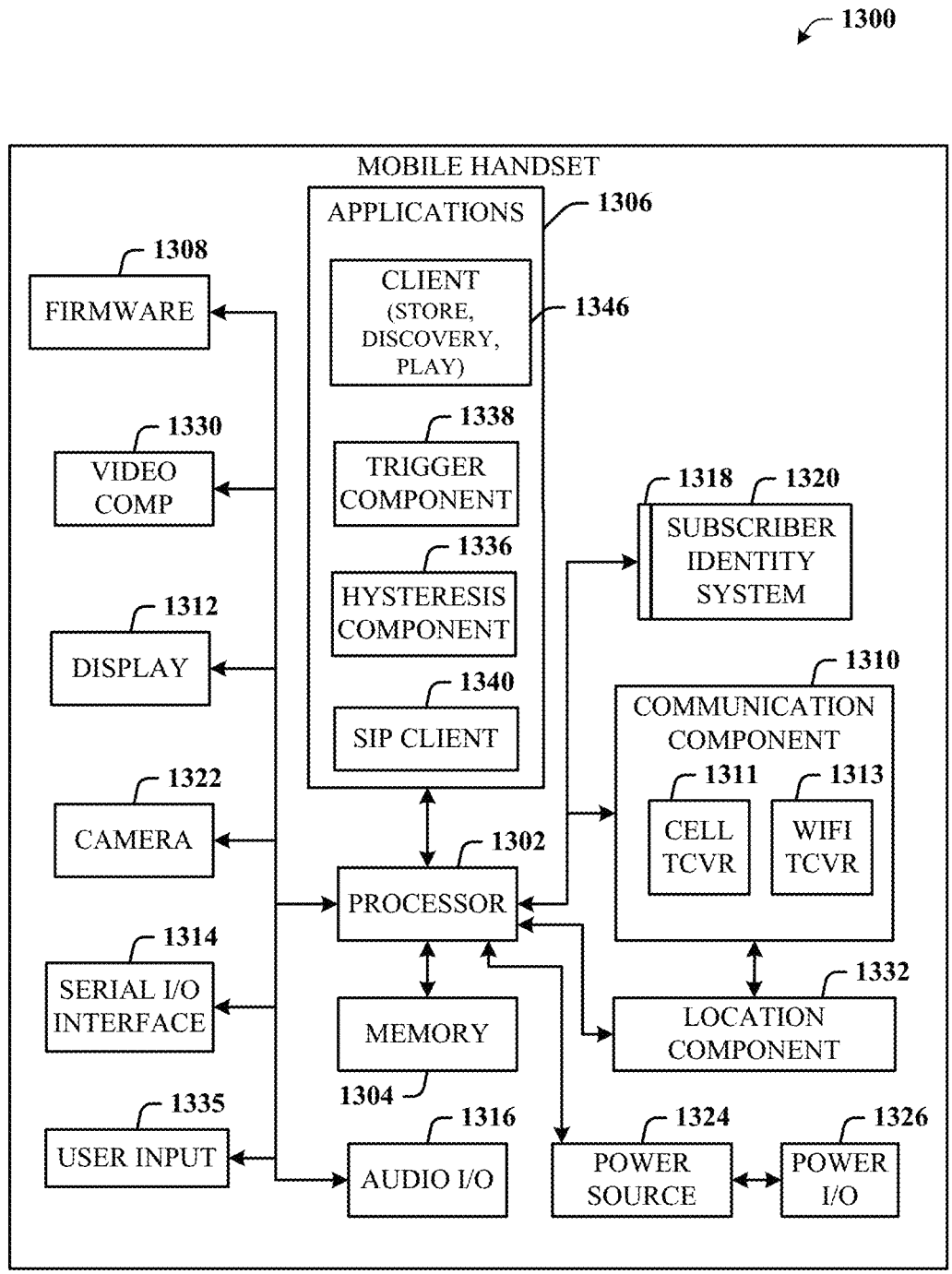
FIG. 13 illustrates an example block diagram of an example user equipment that can be a mobile handset in accordance with various aspects and embodiments of the subject disclosure.

Referring now to FIG. 13, illustrated is a schematic block diagram of an example end-user device such as a user equipment (e.g., UE 102) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1300 comprises a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 comprises a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also comprises a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, comprises an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
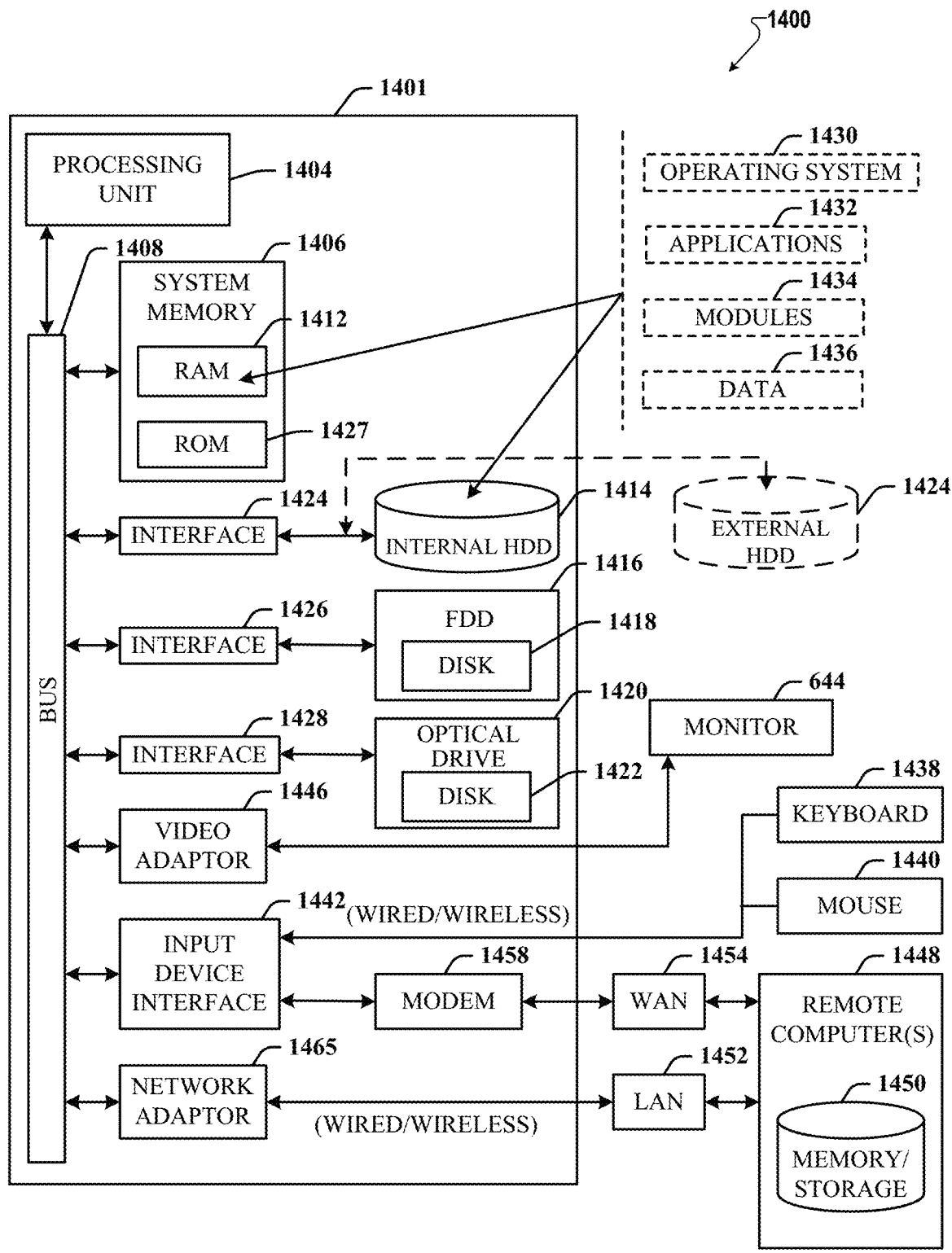
FIG. 14 illustrates an example block diagram of a computer that can be operable to execute processes and methods in accordance with various aspects and embodiments of the subject disclosure.

Referring now to FIG. 14, there is illustrated a block diagram of a computer 1400 operable to execute the functions and operations performed in the described example embodiments. For example, network node devices and relay devices (e.g., network node 104, rTP 210, rTP 500, rTP 501, rTP 502) can contain components as described in FIG. 14. The computer 1400 can provide networking and communication capabilities between a wired or wireless communication network and a server and/or communication device. In order to provide additional context for various aspects thereof, FIG. 14 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein, devices can include a computer 1400, the computer 1400 comprising a processing unit 1404, a system memory 1406 and a system bus 1408. The system bus 1408 couples system components comprising the system memory 1406 to the processing unit 1404. The processing unit 1404 can be any of various commercially available processors. Dual microprocessors and other multiprocessor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 comprises read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further comprises an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1412, comprising an operating system 1430, one or more application programs 1432, other program modules 1434 and program data 1436. All or portions of the operating system, applications, modules, and/or data can also be cached in the RAM 1412. It is to be appreciated that the embodiments can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 2394 serial port, a game port, a USB port, an IR interface, etc.

A monitor 1444 or other type of display device is also connected to the system bus 1408 through an interface, such as a video adapter 1446. In addition to the monitor 1444, a computer 1400 typically comprises other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   facilitating, by a system comprising a processor, an establishment of integrated links comprising backhaul communications links multiplexed with access communications links, wherein the facilitating comprises facilitating a transmission of a multiplexed sync signal to enable synchronization between relay transmission point devices via a communications network, wherein a random access channel procedure is used to complete the establishment, wherein the communication network comprises network equipment, and wherein:
      the backhaul communications links comprise first communications transmission links between the relay transmission point devices, and
      the access communications links comprise second communications transmission links between user equipment and the relay transmission point devices;
   maintaining, by the system, the integrated links comprising measuring channel characteristics of the integrated links using a reference signal; and
   configuring, by the system, the backhaul communications links using the channel characteristics and using a network slice provisioning parameter related to division of the network equipment into subgroups.

2. The method of claim 1, wherein the multiplexed sync signal comprises a signal carrying a relay transmission point identification for discovery of the network equipment.

3. The method of claim 1, further comprising:
   reusing, by the system, a relay transmission point identification for the backhaul communications links.

4. The method of claim 1, further comprising:
   utilizing, by the system, a relay transmission point identification for a selection of a route for data to travel via the backhaul communications links.

5. The method of claim 1, wherein the measuring comprises measuring for link strength of the backhaul communications links.

6. The method of claim 1, wherein the measuring comprises measuring for interference of the backhaul communications links.

7. The method of claim 1, wherein the measuring comprises obtaining the channel characteristics using cell identification-based measurements specific to cells corresponding to the relay transmission point devices.

8. The method of claim 1, wherein the measuring comprises obtaining the channel characteristics using beam-based measurements related to measurements of beams radiated from antennas of the relay transmission point devices specific to respective antenna beams radiated from the relay transmission point devices.

9. The method of claim 1, further comprising:
   determining, by the system, transmission routes between the relay transmission point devices.

10. The method of claim 1, wherein the configuring comprises configuring the backhaul communications links further using a topology maintenance parameter relating to maintaining a topology of network devices enabling the communications network.

11. The method of claim 1, wherein the configuring comprises configuring the backhaul communications links further using a route maintenance parameter related to maintaining a route between at least two of the backhaul communications links.

12. The method of claim 1, wherein the configuring comprises configuring the backhaul communications links further using a backhaul resource allocation parameter related to allocation of backhaul resources of the backhaul communications links.

13. A system, comprising:
    a processor; and
    a memory that stores executable instructions that, when executed by the processor, facilitate performance of operations, comprising:
       facilitating an establishment of integrated communications links, the facilitating comprising:
          transmitting a multiplexed sync signal to enable synchronization between relay transmission point devices, and
          using a random-access channel procedure to complete the establishment, wherein the integrated communications links comprise backhaul communications links multiplexed with access communications links, wherein the backhaul communications links comprise communications transmission links between the relay transmission point devices, and wherein the access communications links comprise communications transmission links between a user equipment and the relay transmission point devices;
       maintaining the integrated communications links by determining channel characteristics of the integrated communications links using a reference signal;
       configuring the backhaul communications links, wherein the configuring comprises using the channel characteristics, and wherein the configuring further comprises using a network slice provisioning parameter that relates to division of specified network devices into subgroups of network devices.

14. The system of claim 13, wherein the operations further comprise:
    receiving the random-access channel procedure preamble to complete the establishment.

15. The system of claim 14, wherein the operations further comprise:

in response to receiving the random-access channel procedure preamble, transmitting a timing advance signal and a transmission grant signal allowing the relay transmission point devices to further communicate via the integrated communications links.

16. The system of claim 13, wherein the operations further comprise:
configuring the backhaul communications links using a topology maintenance parameter relating to maintaining a topology of the specified network devices.

17. A non-transitory computer readable medium comprising executable instructions that, when executed by a processor, facilitate performance of operations, comprising:
facilitating an establishment of integrated links by transmitting a multiplexed sync signal to enable synchronization between relay transmission point devices, and by receiving a random-access channel procedure preamble to complete the establishment, wherein the integrated links comprise backhaul communications links integrated with access communications links, wherein:
the backhaul communications links comprise communications transmission links between relay transmission point devices in a communications network, and
the access communications links comprise communications transmission links between user equipment and the relay transmission point devices;
in response to the receiving the random-access channel procedure preamble, transmitting a timing advance signal and transmitting a transmission grant signal allowing the relay transmission point devices to further communicate via the integrated links;
supporting the integrated links by measuring channel characteristics of the integrated links using a measurement reference signal;
facilitating a formation of radio resource control connections between the relay transmission point devices; and
configuring the backhaul communications links using:
the channel characteristics,
a topology maintenance parameter relating to maintaining a topology of network devices of a communications network, and
a network slice provisioning parameter related to division of network devices of the communications network into subgroups of the network devices.

18. The non-transitory computer readable medium of claim 17, wherein the measuring comprises obtaining the channel characteristics using cell identification-based measurements specific to cells respectively corresponding to the relay transmission point devices.

19. The non-transitory computer readable medium of claim 17, wherein the measuring comprises obtaining the channel characteristics specific to antenna beams respectively radiated from the relay transmission point devices.

20. The non-transitory computer readable medium of claim 17, wherein the measuring comprises measuring for an interference associated with the backhaul communications links.

* * * * *